United States Patent
Nagasawa et al.

(10) Patent No.: US 9,167,227 B2
(45) Date of Patent: Oct. 20, 2015

(54) STEREOSCOPIC VIDEO RECORDING METHOD, STEREOSCOPIC VIDEO RECORDING MEDIUM, STEREOSCOPIC VIDEO REPRODUCING METHOD, STEREOSCOPIC VIDEO RECORDING APPARATUS, AND STEREOSCOPIC VIDEO REPRODUCING APPARATUS

(71) Applicant: MITSUBISHI ELECTRIC CORPORATION, Chiyoda-ku, Tokyo (JP)

(72) Inventors: Masato Nagasawa, Tokyo (JP); Keiji Hatanaka, Tokyo (JP); Kazuhiro Kurisaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/192,120

(22) Filed: Feb. 27, 2014

(65) Prior Publication Data

US 2014/0176675 A1 Jun. 26, 2014

Related U.S. Application Data

(62) Division of application No. 12/153,244, filed on May 15, 2008, now abandoned.

(30) Foreign Application Priority Data

Nov. 29, 2007 (JP) .................................. 2007-309084

(51) Int. Cl.
H04N 13/04 (2006.01)
H04N 13/00 (2006.01)
(Continued)

(52) U.S. Cl.
CPC ......... *H04N 13/0048* (2013.01); *H04N 13/007* (2013.01); *H04N 13/0033* (2013.01);
(Continued)

(58) Field of Classification Search
CPC .......... H04N 13/0452; H04N 13/0454; H04N 13/0456
See application file for complete search history.

(56) References Cited

U.S. PATENT DOCUMENTS 5,796,373 A * 8/1998 Ming-Yen ......................... 345/6
6,072,831 A    6/2000 Chen
(Continued)

FOREIGN PATENT DOCUMENTS

EP   1049096 A2   11/2000
JP   2-131697 A    5/1990
(Continued)

*Primary Examiner* — Jeffrey Pwu
*Assistant Examiner* — Thong Truong
(74) *Attorney, Agent, or Firm* — Birch, Stewart, Kolasch & Birch, LLP

(57) ABSTRACT

The present invention is for more optimally performing recording and reproduction of stereoscopic video. In the present invention, parallax information is utilized to store, in a recording medium, stereoscopic video including left-eye images and right-eye images. Particularly, for video content that contains stereoscopic images, information is obtained regarding the amount of variation in parallactic angle having a given or larger value, a variation time that the variation in parallactic angle takes, and the number of times that the variation in parallactic angle occurs. An evaluation value is calculated that corresponds to the degree of eye fatigue on the basis of the amount of variation, the variation time, and the number of times of the variation. According to the present invention, the video content is encoded in such a manner that the evaluation value is within a given range, and then recorded in the recording medium.

3 Claims, 36 Drawing Sheets

(51) Int. Cl.
*H04N 19/597* (2014.01)
*H04N 19/70* (2014.01)
*H04N 19/46* (2014.01)
*H04N 19/61* (2014.01)
*H04N 13/02* (2006.01)

(52) U.S. Cl.
CPC ....... *H04N13/0055* (2013.01); *H04N 13/0454* (2013.01); *H04N 19/46* (2014.11); *H04N 19/597* (2014.11); *H04N 19/61* (2014.11); *H04N 19/70* (2014.11); *H04N 13/004* (2013.01); *H04N 13/0059* (2013.01); *H04N 13/0239* (2013.01); *H04N 13/0431* (2013.01); *H04N 13/0434* (2013.01); *H04N 13/0438* (2013.01); *H04N 13/0456* (2013.01); *H04N 2213/002* (2013.01)

(56) References Cited

U.S. PATENT DOCUMENTS

| | | |
|---|---|---|
| 6,075,556 A | 6/2000 | Urano et al. |
| 6,574,423 B1 | 6/2003 | Oshima et al. |
| 2001/0055464 A1 | 12/2001 | Miyaki et al. |
| 2004/0239685 A1 | 12/2004 | Kiyokawa et al. |
| 2005/0031315 A1 | 2/2005 | Kageyama et al. |
| 2005/0041960 A1 | 2/2005 | Oh |
| 2005/0248561 A1 | 11/2005 | Ito et al. |
| 2006/0050383 A1 | 3/2006 | Takemoto et al. |
| 2006/0209183 A1 | 9/2006 | Mashitani et al. |

FOREIGN PATENT DOCUMENTS

| | | |
|---|---|---|
| JP | 08-110868 A | 4/1996 |
| JP | 9-46630 A | 2/1997 |
| JP | 10-69755 A | 3/1998 |
| JP | 10-174110 A | 6/1998 |
| JP | 10-191393 A | 7/1998 |
| JP | 11-261943 A | 9/1999 |
| JP | 11-289555 A | 10/1999 |
| JP | 2000-270347 A | 9/2000 |
| JP | 2001-16550 A | 1/2001 |
| JP | 2001-160945 A | 6/2001 |
| JP | 2001-197441 A | 7/2001 |
| JP | 2003-132624 A | 5/2003 |
| JP | 2003-185967 A | 7/2003 |
| JP | 2003-319419 A | 7/2003 |
| JP | 2004-274125 A | 9/2004 |
| JP | 2004-336701 A | 11/2004 |
| JP | 2005-94168 A | 4/2005 |
| JP | 2005-260988 A | 9/2005 |
| JP | 2006-114213 A | 4/2006 |
| JP | 2007-503751 A | 2/2007 |
| JP | 2007-166651 A | 6/2007 |
| WO | WO 03/092303 A1 | 11/2003 |
| WO | WO 2004/071102 A | 8/2004 |

* cited by examiner

F I G . 1
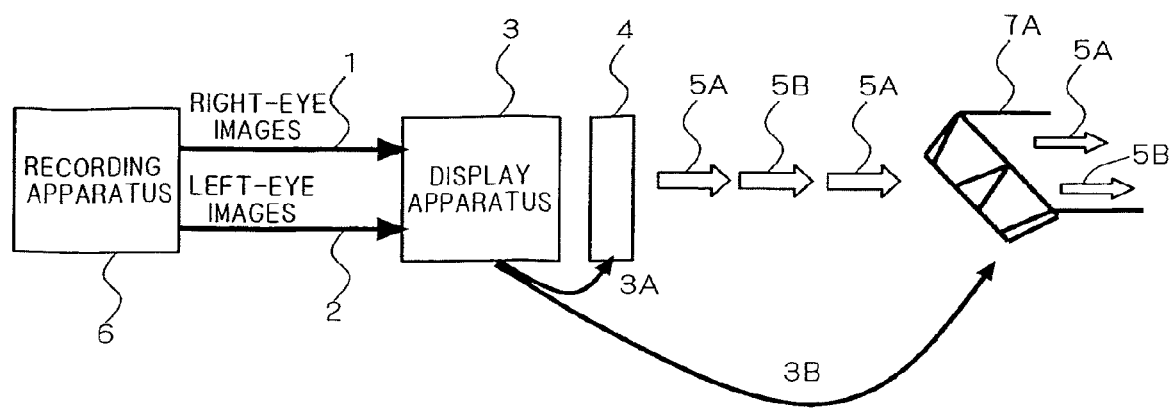

F I G . 5
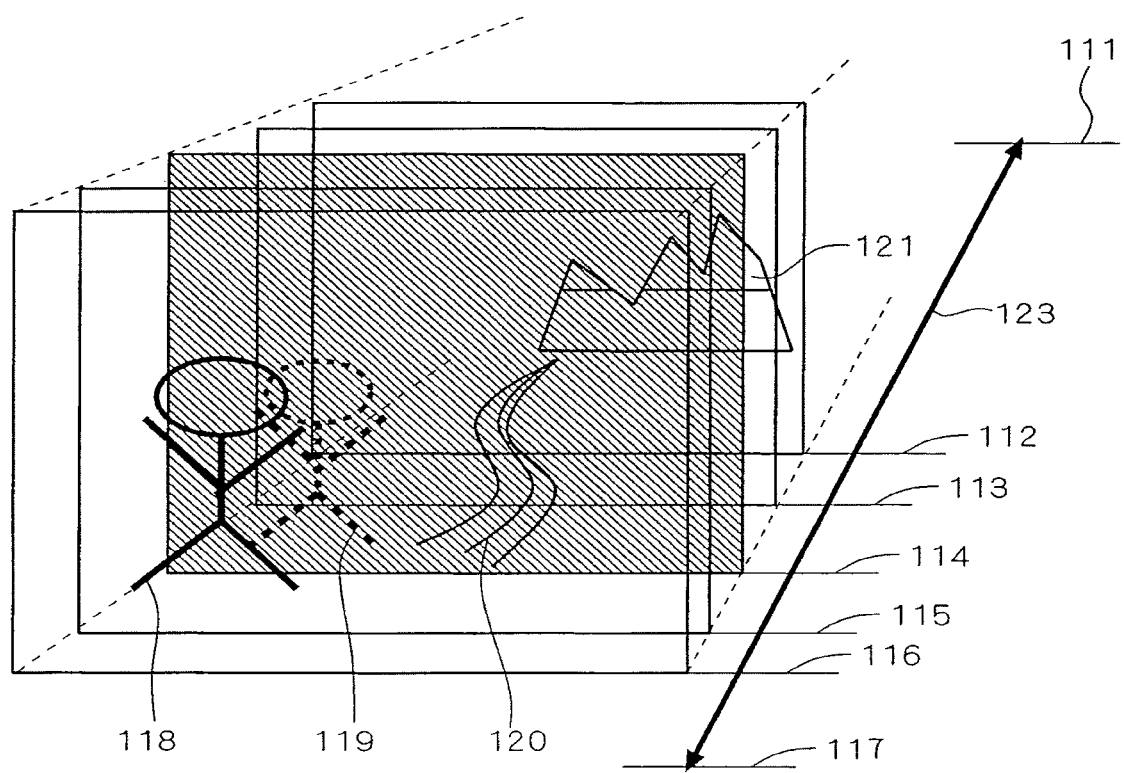

F I G . 8
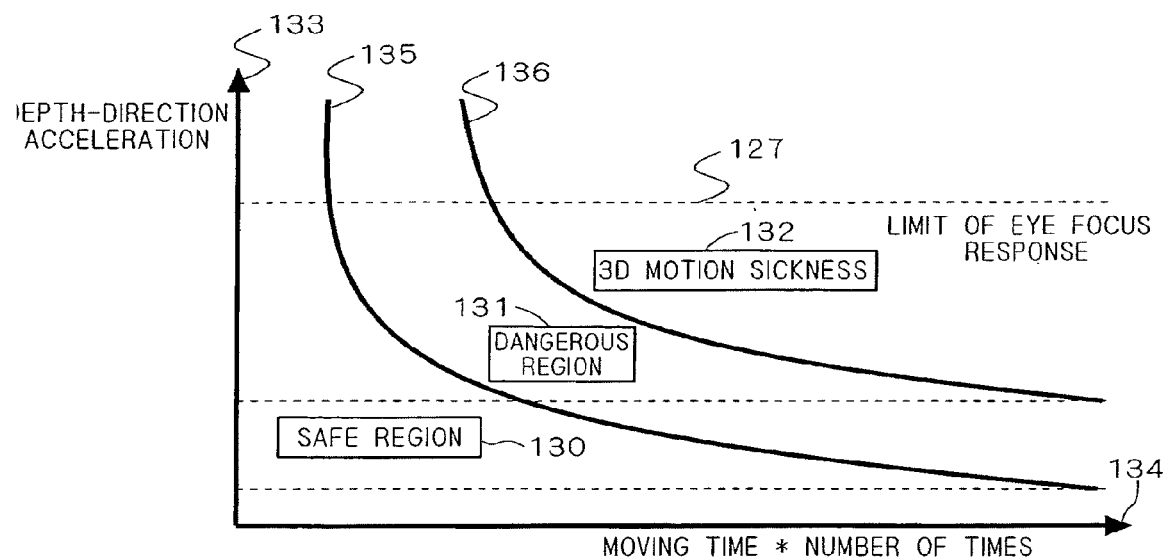
F I G . 9
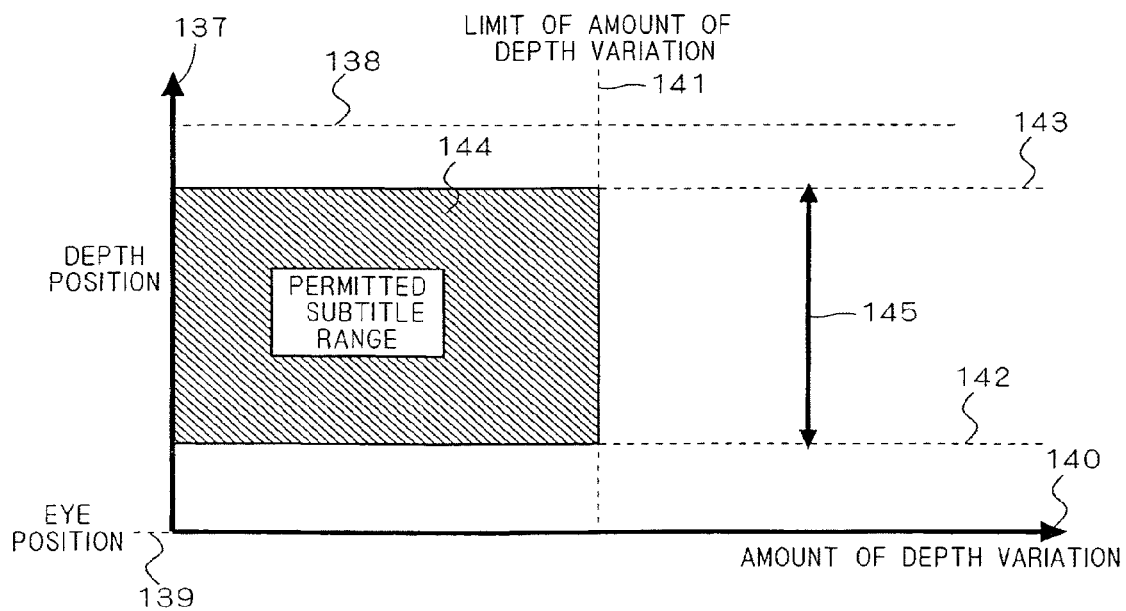

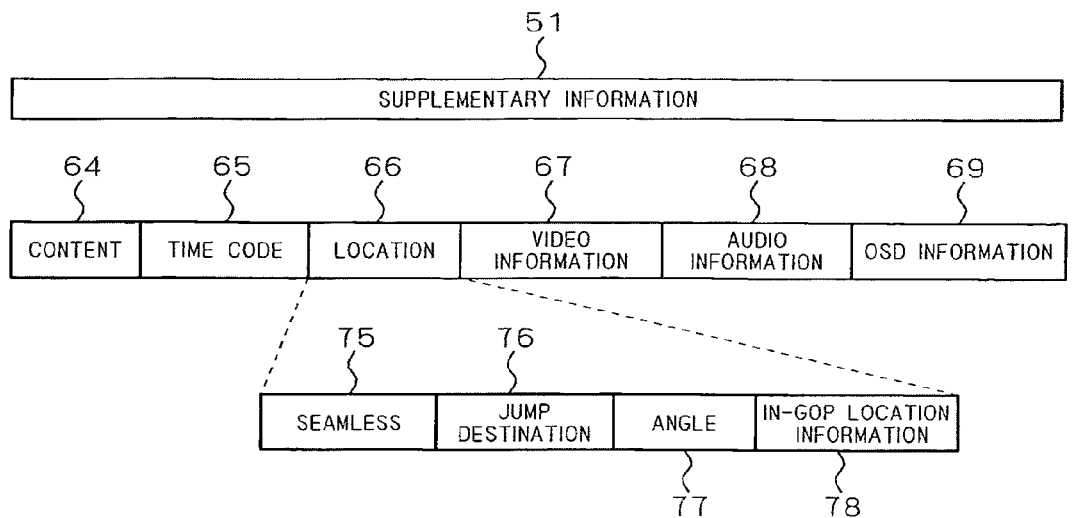
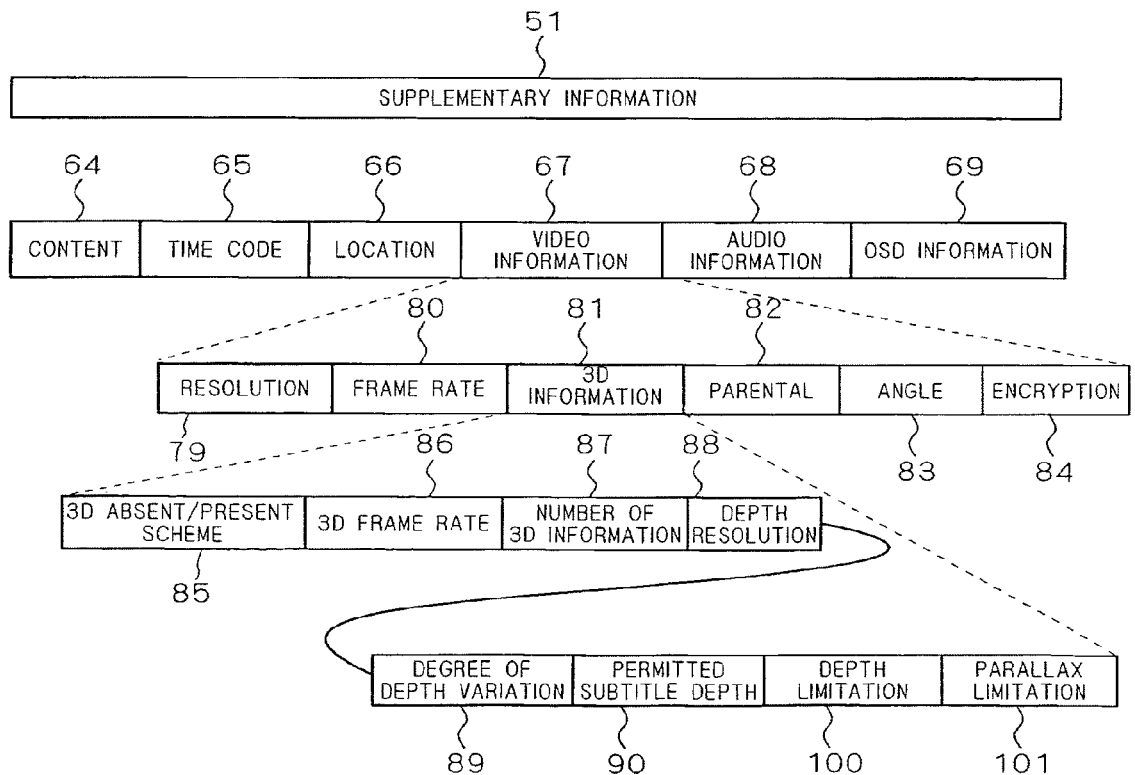

F I G . 3 6
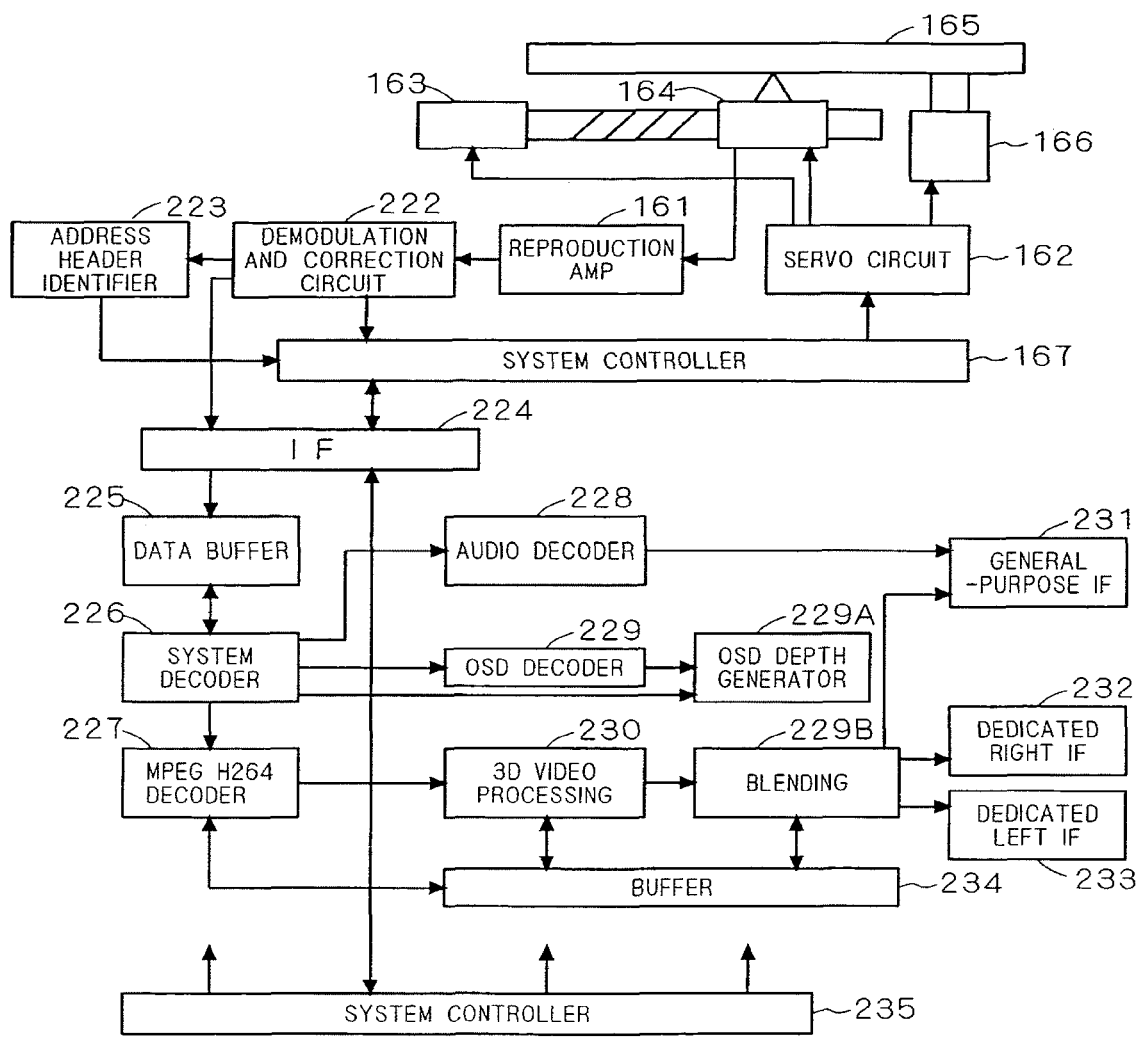

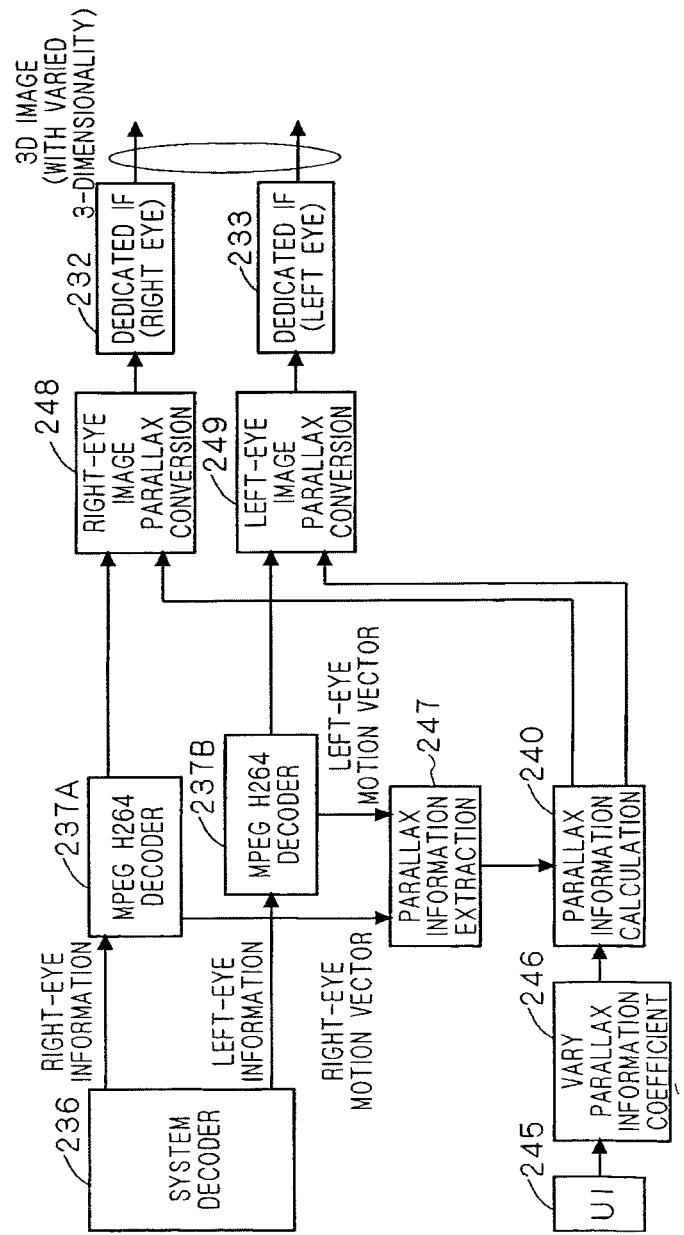

STEREOSCOPIC VIDEO RECORDING METHOD, STEREOSCOPIC VIDEO RECORDING MEDIUM, STEREOSCOPIC VIDEO REPRODUCING METHOD, STEREOSCOPIC VIDEO RECORDING APPARATUS, AND STEREOSCOPIC VIDEO REPRODUCING APPARATUS

CROSS REFERENCE TO RELATED APPLICATIONS

The present application is a Continuation of copending application Ser. No. 12/153,244 filed on May 15, 2008, which claims foreign priority to Application No. JP 2007-309084 filed in Japan on Nov. 29, 2007. The entire contents of both of the above applications are hereby incorporated by reference.

BACKGROUND OF THE INVENTION

1. Field of the Invention

The present invention relates to a stereoscopic video recording method, a stereoscopic video recording medium, a stereoscopic video reproducing method, a stereoscopic video recording apparatus, and a stereoscopic video reproducing apparatus.

2. Description of the Background Art

With the progress of encoding techniques for compressing digital video signals, it has become possible to implement optical disk apparatuses with excellent searchability and operability by recording compressed video signals to optical disks. Such optical disk apparatuses are free from degradation caused by dubbing, because they record digital video signals instead of analog video signals, and such optical disk apparatuses offer improved reliability because they employ non-contact optical recording and reproduction.

Encoding methods for compressing such digital video signals include the MPEG (Moving Picture coding Experts Group) standards, for example. The MPEG compression offers improved compression efficiency as compared with "intra" compression methods such as motion JPEG, but it still has restrictions due to the use of motion-compensated prediction in the temporal direction; for example, searches can be made only in units of groups of multiple pictures (GOPs), and access on the disk requires accessing an intra-compressed I picture first. Accordingly, Japanese Patent Application Laid-Open No. 2005-260988 (Patent Document 1) suggests a devised data format on an optical disk.

However, the data format of Patent Document 1 has been made only for filing of two-dimensional, flat images. For filing of stereoscopic images, the method of Japanese Patent Application Laid-Open No. 2007-166651 has to be adopted, in which a right-eye image and a left-eye image are separately displayed in the first and second fields of a TV signal, and the two individual field images are viewed by the respective eyes through the use of means such as polarizing eyeglasses.

Viewing stereoscopic (hereinafter referred to also as 3D) video for many hours causes discomforts such as eye fatigue and 3D motion sickness, because the viewer moves the eyes in the focal direction with increased frequency. Three-dimensional viewing will be problematic especially when the point of attention busily moves in the depth direction. Also, in particular, the display of subtitles and the like requires continuously switching the eye focus, and may cause more intense discomforts like eye fatigue and 3D motion sickness than the viewing of ordinary 3D video.

Also, as to the recording of stereoscopic video information, when filing a stereoscopic video that employs parallax between right-eye images and left-eye images on an optical disk, it was not possible to handle a video stream including a mixture of flat (hereinafter referred to also as 2D) images and stereoscopic (3D) images. Particularly, for example, when the display apparatus is switched while the reproducing apparatus is reproducing stereoscopic video, or when a display apparatus is newly connected, information required for 3D display cannot be sent to the display apparatus side in a linked manner, and so the settings in the display apparatus cannot be changed instantaneously.

Also, as to the recording of stereoscopic video information, when filing a stereoscopic video employing parallax between right-eye and left-eye images on an optical disk, there is no video control information that allows recording of broadcasted stereoscopic video and that enables settings in the display apparatus and the reproducing apparatus.

Also, distributed content, such as movies, are usually released at different times, for preferentially releasing businesses such as movie theaters and for the distribution as media, and therefore "code" is provided to limit the region where the movie can be viewed, according to the conditions of distribution of the movie. Also, the distribution of stereoscopic video content is affected by the extent of proliferation of compatible display apparatuses, and it is necessary to further set separate regional restrictions for 3D video and for 2D video. However, conventional systems do not meet such requirements.

Also, it was not possible to superimpose information about the content, copyright information, 3D display scheme information, OSD information, multi-angle information, etc. on a stereoscopic video stream, and therefore it was not possible to instantaneously change the settings on the display apparatus side, not on the reproducing apparatus side.

Also, unlike ordinary 2D video information, 3D video information utilizing parallax includes information for the left-eye and information for the right eye, and the amount of information is doubled and filing efficiency is deteriorated.

Also, while increased eye fatigue occurs during the reproduction of 3D video with an increased degree of three-dimensionality, it was not possible to give a warning to the user in advance according to the degree of three-dimensionality, or to restrict the viewing according to the age of the user. Also, while increased eye fatigue occurs during the reproduction of 3D video with an increased degree of three-dimensionality, it was not possible to alleviate the three-dimensionality of the content on the reproducing apparatus side.

SUMMARY OF THE INVENTION

An object of the present invention is to provide a stereoscopic video recording method, a stereoscopic video recording medium, a stereoscopic video reproducing method, a stereoscopic video recording apparatus, and a stereoscopic video reproducing apparatus that are capable of more optimally performing recording and reproduction of stereoscopic video.

A stereoscopic video recording method according to the preferred embodiment of the present invention records, in a recording medium, stereoscopic video including left-eye and right-eye images utilizing parallax information. From video content that contains stereoscopic video, the stereoscopic video recording method of the invention grasps the amount of variation in parallactic angle having a given or larger value, a variation time that the variation in parallactic angle takes, and the number of times that the variation in parallactic angle occurs. The method then calculates an evaluation value that corresponds to the degree of eye fatigue on the basis of the amount of variation, the variation time, and the number of times of the variation, encodes the video content in such a manner that the evaluation value is within a given range, and records the encoded video content in the recording medium.

The stereoscopic video recording method of the preferred embodiment of the present invention calculates an evaluation value that corresponds to the degree of eye fatigue on the basis of the amount of variation, the variation time, and the number of times of the variation, and encodes the video content in such a manner that the evaluation value is within a given range. It is thus possible to produce video content that only involves eye fatigue limited within a certain range and to provide the video content to users.

A stereoscopic video reproducing method according to the preferred embodiment of the present invention reproduces stereoscopic video including left-eye and right-eye images utilizing parallax information. According to the stereoscopic video reproducing method of the invention, a recording medium records video content that includes stereoscopic video and that is encoded in such a manner that a maximum parallactic angle value grasped from the video content is not more than a given value, and the stereoscopic video reproducing method reads the maximum parallactic angle value from the recording medium, and displays the maximum parallactic angle value when a user views the video content so that the user can recognize the maximum degree of three-dimensionality of the stereoscopic video.

The stereoscopic video reproducing method of the preferred embodiment of the present invention displays the maximum parallactic angle value so that the user can recognize the maximum degree of three-dimensionality of the stereoscopic video when viewing the video content, and it is thus possible to objectively grasp the influence of the stereoscopic video on the user.

A stereoscopic video recording apparatus according to the preferred embodiment of the present invention includes one video generating block provided for one of the left and right eyes and another video generating block provided for the other eye, or includes one video generating block that is operated at a doubled rate. Each of the one and another video generating blocks, or the one video generating block, includes: an AD converter that digitizes a video signal of video content that contains stereoscopic video; a motion detecting circuit that detects motion vectors necessary to video-compress the digitized video signal in a temporal direction; a DCT transform circuit that applies DCT transform necessary for intra-compression to the digitized video signal; an adaptive quantization circuit that applies quantization necessary for intra-compression to the DCT-transformed video signal; a variable-length coding circuit that applies variable-length coding necessary for intra-compression to the quantized video signal; and an inverse quantization circuit and an inverse DCT transform circuit that decode the quantized video signal as a local decoder. The stereoscopic video recording apparatus of the invention records the video content and its supplementary information in a recording medium, wherein the video content is composed of digital video information including an I picture that is data-compressed within a frame, a P picture that is data-compressed with motion compensation from the I picture in a preceding direction in time, and a B picture that is data-compressed with motion compensation from the I or P picture in a preceding/following direction in time, and in the video content, flat and stereoscopic images in units of the digital video information or an integral multiple of the digital video information exist in a mixed manner, and form a temporally continuous video unit.

The stereoscopic video recording apparatus of the preferred embodiment of the present invention includes video generating blocks for left-eye images and for right-eye images, or one video generating block that is driven at a doubled rate, and the apparatus is capable of obtaining appropriate stereoscopic images.

A stereoscopic video reproducing apparatus according to the preferred embodiment of the present invention reproduces a recording medium that records video content and supplementary information, wherein the video content is composed of digital video information including an I picture that is data-compressed within a frame, a P picture that is data-compressed with motion compensation from the I picture in a preceding direction in time, and a B picture that is data-compressed with motion compensation from the I or P picture in a preceding/following direction in time, and in the video content, flat images and stereoscopic images utilizing parallax information in units of the digital video information or an integral multiple of the digital video information exist in a mixed manner, and form a temporally continuous video unit. The stereoscopic video reproducing apparatus of the invention includes: a system decoder that separates a video stream containing video audio data from a signal read from the recording medium; a compressed-video decoder that decompresses compressed video of the separated video stream; an audio decoder that decompresses compressed audio of the separated video stream; an OSD decoder that extracts OSD information that contains subtitle display from the supplementary information; a depth generating circuit that generates a depth-direction location of the OSD information from the supplementary information; a stereoscopic video processing circuit that generates the stereoscopic images from the video information decompressed by the compressed-video decoder; and a blending circuit that superimposes the OSD information on the stereoscopic images.

The stereoscopic video reproducing apparatus of the preferred embodiment of the present invention considers the location of OSD information in the depth direction when superimposing the OSD information on stereoscopic images, and it is thus possible to further alleviate the eye fatigue caused by the viewing of the OSD information and stereoscopic images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual diagram of a stereoscopic video display system using a shutter according to a first preferred embodiment of the present invention;

FIG. 5 is a schematic diagram illustrating a stereoscopic video image according to the first preferred embodiment of the present invention;

FIG. 8 is a diagram used to illustrate the degree of eye fatigue and depth-direction acceleration according to the first preferred embodiment of the present invention;

FIG. 9 is a diagram illustrating a range of display of subtitles according to the first preferred embodiment of the present invention;

FIG. 16 is a diagram illustrating location information in the supplementary information according to the second preferred embodiment of the present invention;

FIG. 17 is a diagram illustrating video information in the supplementary information according to the second preferred embodiment of the present invention;

FIG. 36 is a block diagram of a stereoscopic video reproducing apparatus according to a fourth preferred embodiment of the present invention;

FIG. 40 is a diagram illustrating a stereoscopic video reproducing apparatus according to the fourth preferred embodiment.

DESCRIPTION OF THE PREFERRED EMBODIMENTS

First Preferred Embodiment

Figure 2:
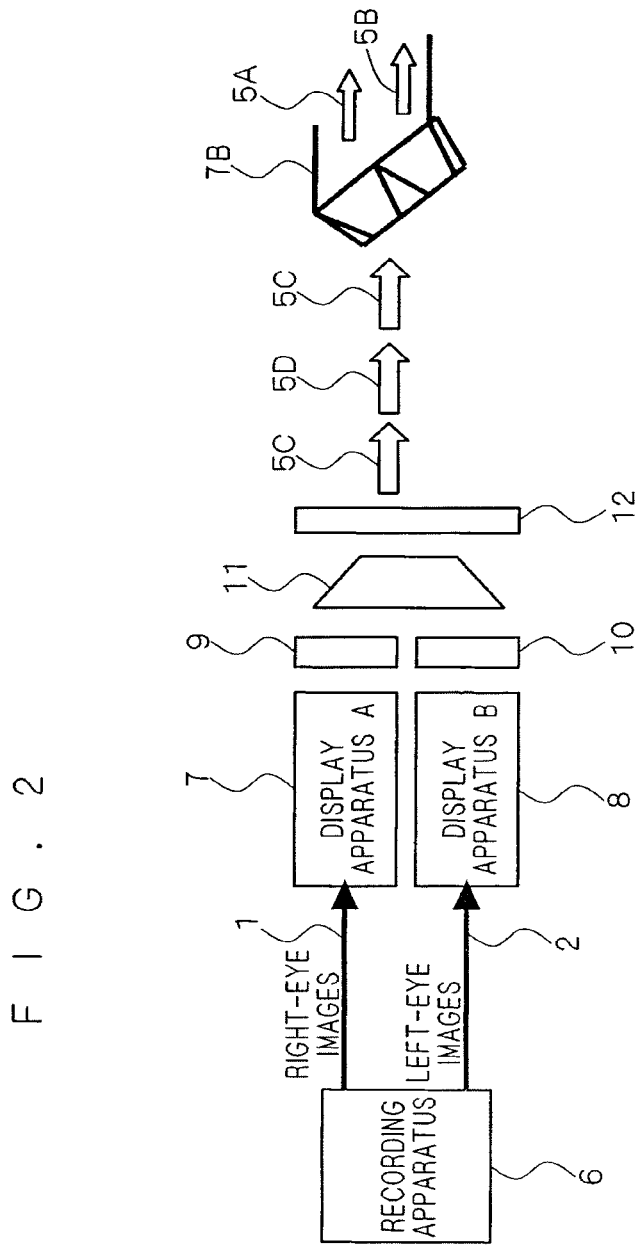
FIG. 2 is a conceptual diagram of a stereoscopic video display system using polarizing filters according to the first preferred embodiment of the present invention.

A first preferred embodiment of the present invention will now be described referring to the drawings. FIG. 1 is a block diagram illustrating the overall configuration of a stereoscopic video system according to this preferred embodiment. The stereoscopic video system shown in FIG. 1 includes a stereoscopic video recording apparatus 6 (which will hereinafter be simply referred to also as a recording apparatus 6) for reproducing a medium that records stereoscopic video and outputting right-eye images 1 and left-eye images 2, a display apparatus 3 such as a TV or a projector, a shutter 4 composed of e.g. liquid crystal and capable of switching two transmissive polarized light rays, and eyeglasses 7A having liquid-crystal shutters on the left and right, or having different polarizing plates on the left and right, so as to view a frame sequence of video images 5A and 5B through the shutter 4. FIG. 2 illustrates another example of the configuration of a stereoscopic video system of the first preferred embodiment. Unlike that shown in FIG. 1, the stereoscopic video system of FIG. 2 includes two display apparatuses A and B, polarizing plates 9 and 10 for respectively passing light rays having particular polarization components of different directions, an optical system 11 for projection onto a display panel 12, and eyeglasses 7B having different polarizing plates on the left and right for viewing a frame sequence of video images 5C and 5D through the polarizing plates 9 and 10.

Figure 3:
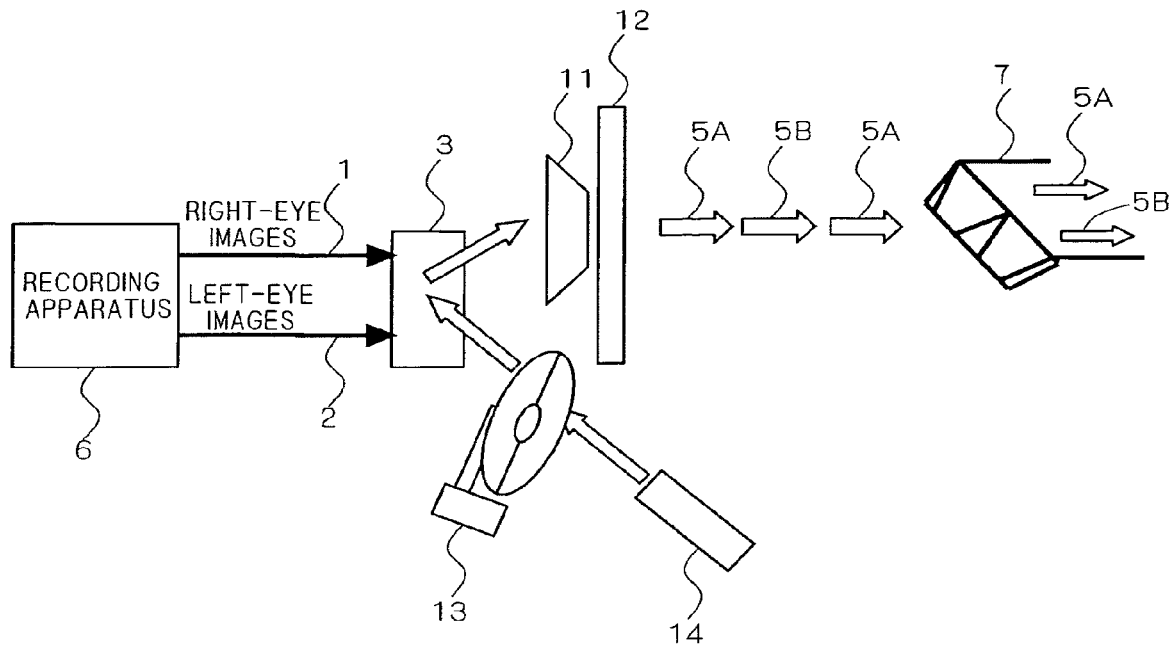
FIG. 3 is a conceptual diagram of a stereoscopic video display system using a rotary polarizing filter according to the first preferred embodiment of the present invention.
Figure 4:
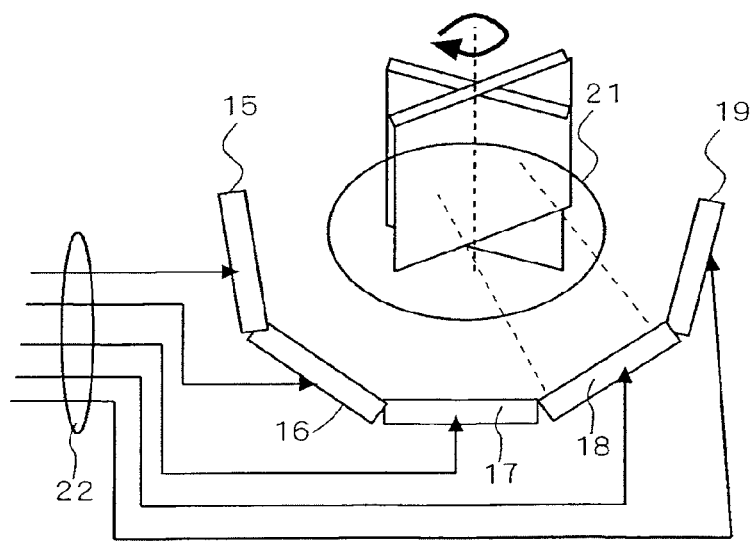
FIG. 4 is a conceptual diagram of a stereoscopic video display system using multiple information according to the first preferred embodiment of the present invention.

FIG. 3 illustrates still another example of the configuration of a stereoscopic video system of the first preferred embodiment. Unlike that shown in FIG. 1, the stereoscopic video system of FIG. 3 includes a synchronous rotating member 13 having a circular rotary disk in which semi-circular polarizing plates are bonded to pass light of particular polarization components of different directions, and a light source 14 for projecting light to the synchronous rotating member 13. FIG. 4 illustrates still another example of the configuration of a stereoscopic video system of the first preferred embodiment. Unlike that shown in FIG. 1, the stereoscopic video system of FIG. 4 includes display devices 15 to 19 for projecting a plurality of video images based on video signals 22, and a rotary mirror 21 for reproducing the projected stereoscopic video images.

Figure 6:
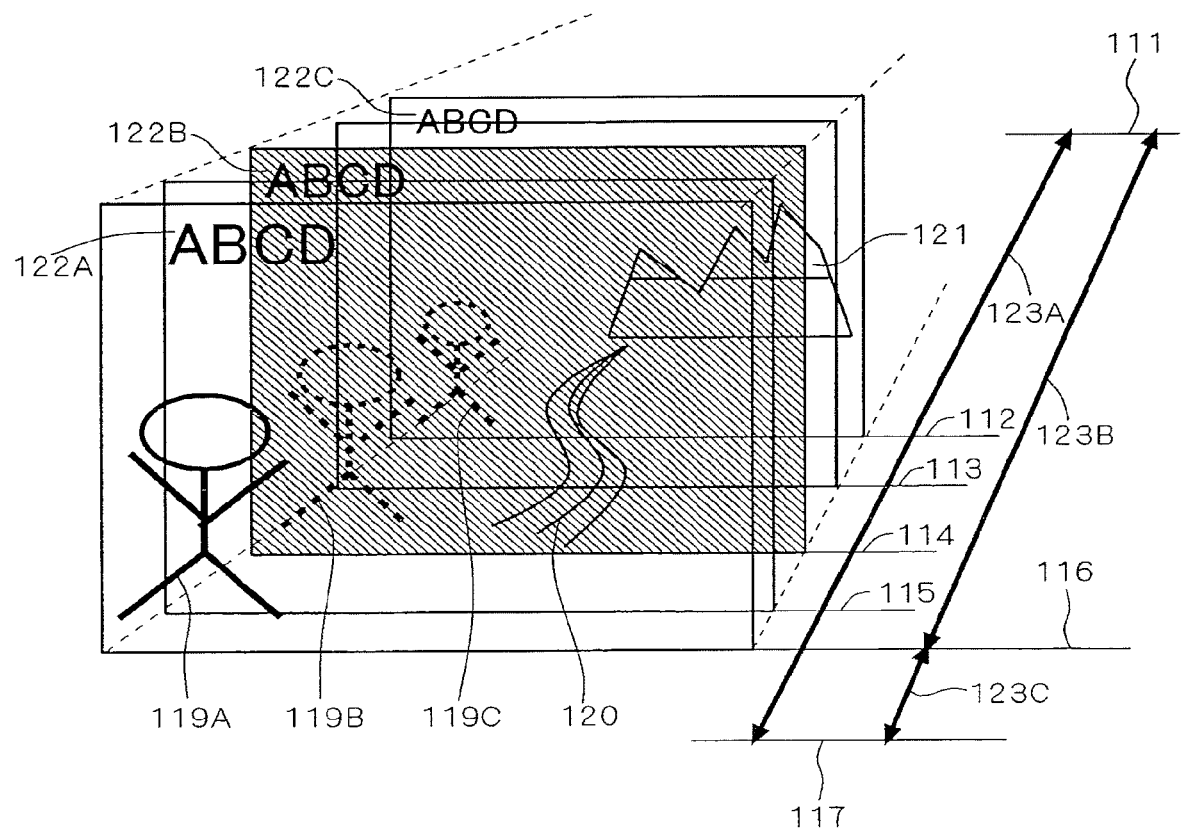
FIG. 6 is a schematic diagram illustrating a stereoscopic video image including display of subtitles according to the first preferred embodiment of the present invention.

FIG. 5 is a schematic diagram illustrating the human perception of stereoscopic video. FIG. 5 shows sequential depth positions 112 to 117 from an infinite distance 111, where the depth position 117 is the most protruding position (closest to the eyes). FIG. 5 also shows a person 118 displayed at the depth position 115, a person 119 displayed at the depth 114, a river 120 flowing from a distance, and a mountain 121 viewed at a distance. FIG. 6 shows the display of FIG. 5 with subtitles added thereto, which shows subtitles 122A to 122C displayed at respective depth positions and subtitle depth ranges 123A to 123C.

Figure 7A:
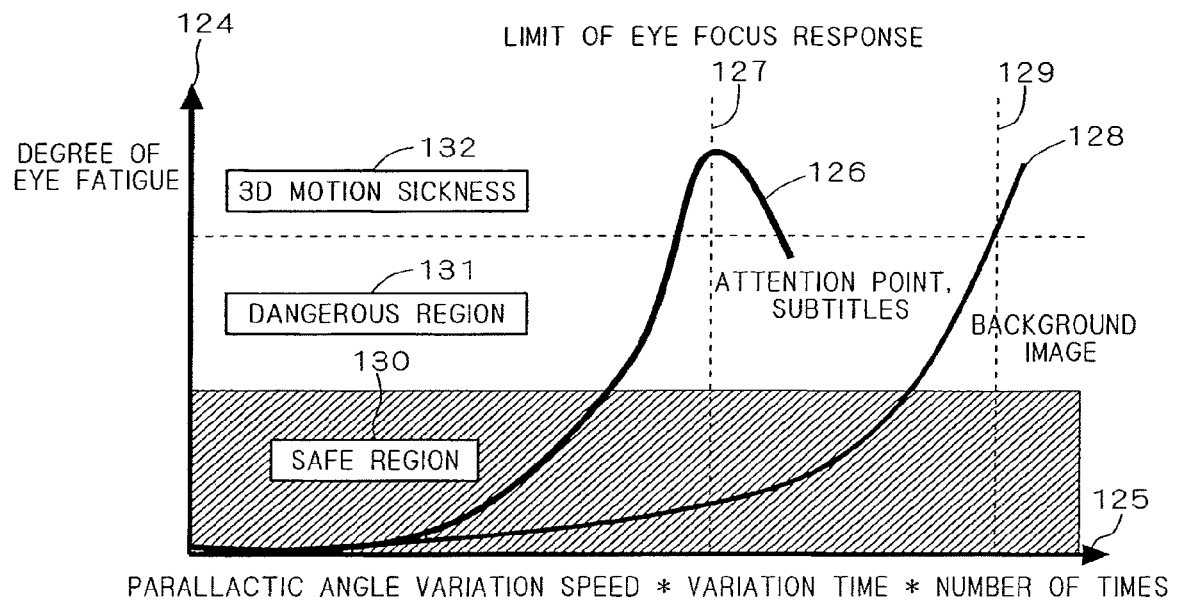
FIGS. 7A and 7B are diagrams used to illustrate the degree of eye fatigue according to the first preferred embodiment of the present invention.
Figure 7B:
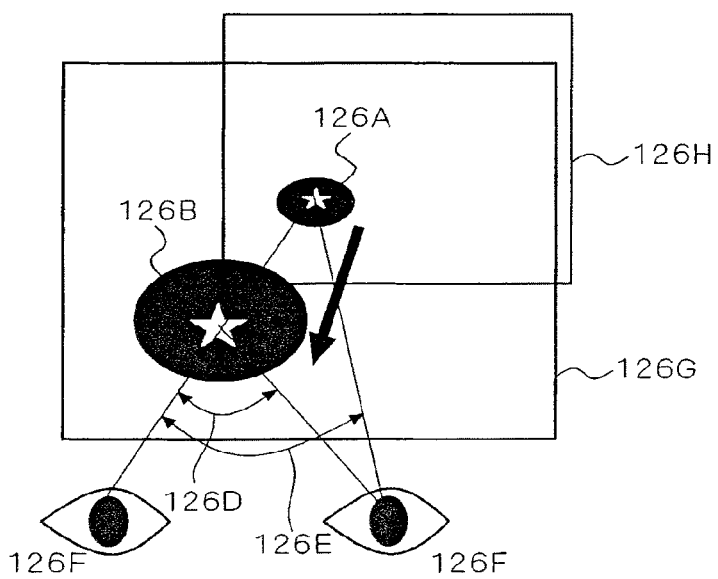

FIGS. 7A and 7B are diagrams illustrating the degree of eye fatigue with respect to "acceleration of parallactic angle variation the time that the variation takes the number of times that the variation occurs". In FIG. 7A, the vertical axis shows the degree of eye fatigue 124, and the horizontal axis shows the product 125 of the angular variation acceleration, the variation time, and the number of times, and FIG. 7A shows the degree of eye fatigue 126 about a point of attention and subtitles, a maximum-fatigue point 127 about the point of attention and subtitles, the degree of eye fatigue 128 about the background image, a limit 129 over which the background image causes motion sickness, a safe region 130 for human eyes, a dangerous region 131 for human eyes, and a region 132 where human eyes suffer 3D motion sickness. FIG. 7B is a schematic diagram illustrating the parallactic movement of the eyes, which shows a far object 126A as a point of attention, a near object 126B as a point of attention, a viewing angle 126D of the near object, a viewing angle 126E of the far object, human eyes 126F, a depth 126G at which the object 126B is displayed, and a depth 126H at which the object 126A is displayed.

FIG. 8 is a graph illustrating a relation between "depth-direction acceleration of a point of attention" and "moving time×number of times". In the graph of FIG. 8, the vertical axis shows the point-of-attention depth-direction acceleration 133 and the horizontal axis shows the product of moving time and number of times (moving time×number of times) 134, and FIG. 8 shows a boundary 135 between a safe region 130 and a dangerous region 131, and a boundary 136 between the dangerous region 131 and a 3D motion sickness occurring region 132. FIG. 9 illustrates a relation between the depth position and the amount of depth-position variation of subtitles. In FIG. 9, the vertical axis shows the depth position 137 and the horizontal axis shows the amount of depth variation 140, and FIG. 9 shows an infinite distance position 138, an eye position (most forward) 139, a limit 141 of the amount of depth variation, a depth limitation 142 on the near side (a limitation of protrusion), and a depth limitation 143 on the far side.

Now, as shown in FIGS. 1 to 3, a stereoscopic video system using a TV or projector generally utilizes parallax information about human eyes, by projecting visual information about left and right images to provide a three-dimensional view through eyeglasses. In general, the filming of images uses two cameras to take pictures for the left eye and the right eye, and hence produces two streams. In such a system, the visual information for the left and the right stored in the recording apparatus 6 is inputted to a display apparatus such as a TV or a projector. In this process, when the information interface between the recording apparatus 6 and the display apparatus is analog, separate transmissions of information are required for the left and the right. However, in the case of a digital interface such as HDMI, the information for the left and the information for the right can be alternately transmitted in a serial manner. Also, the information may be sent in a compressed form from the recording apparatus 6 and decompressed on the TV side. Also, in the case of TV display, left image information and right image information are switched field by field, in which case, during the process of dividing the reproduced right and left images field by field, problems like flickering can be prevented and smooth stereoscopic video reproduction can be achieved by using a latest TV employing "scan doubling".

As shown in FIG. 1, when the shutter 4 is composed of liquid crystal such that two transmissive polarized light rays can be switched, it is possible to vary the polarizing angle of light for each field by controlling the shutter 4, for example with the transmitted field image 5A being vertically polarized, and the image 5B being horizontally polarized. In this case, the eyeglasses 7A are composed of different polarizing plates (vertical polarization and horizontal polarization) that are bonded on the right and left, and there is no need for the cable 3B from the display apparatus 3 to the eyeglasses 7A, for supplying a signal corresponding to the timing by which the display apparatus 3 controls the shutter 4 through the cable 3A. On the other hand, when the shutter 4 is not used, the eyeglasses 7A have to be equipped with liquid-crystal shutters, and the cable 3B is needed as a field-synchronization signal cable. When liquid-crystal shutters are provided on the eyeglasses 7A side, no polarized light is used, and so the stereoscopic display is not significantly influenced even when the angle of the eyeglasses is changed, e.g. when the viewer bends his neck.

The system shown in FIG. 2 includes two display devices having PLD (Paper-like Display) elements or a transmitting liquid-crystal type, and different images are displayed separately on the left and right. In this case, the polarizing plates 9 and 10 having different polarizing directions are provided in front of the display devices (A and B) 7 and 8. Thus, the light rays emitted from the respective display light emitting portions have different polarizations, and the rays of light are projected to the display panel 12 through the optical system 11 so that the right eye views a vertically-polarized image 5C and the left eye views a horizontally-polarized image 5D, for example. In this case, the polarizing eyeglasses 7B are used to cause the video information having parallax to enter the respective eyes.

In the system of FIG. 3, the light-source portion, for emitting light onto optical elements like PLD, includes a polarized light switching mechanism having the synchronous rotating member 13 that rotates in synchronization with the timing of TV field display, so that light having polarization adjusted to the timing of field display enters the PLD element etc. In this case, an image of different polarized light for each field is projected to the image display panel. It is thus possible to view images with parallax through the polarizing eyeglasses 7 constructed as shown in FIG. 2. There is another method for reproducing stereoscopic images in which, as shown in FIG. 4, a plurality of display devices 15 to 19 are used to project images that are filmed from a plurality of angles. In this case, it is necessary to store and reproduce a plurality of stereoscopic video streams, instead of two streams.

In another scheme for directing left and right images to the corresponding eyes, the synchronous rotating member 13, which rotates in synchronization with the timing of TV field display, is composed of optical filters that pass only particular wavelengths of RGB, one half of the disk being allocated for the left eye and the other half for the right eye, and the respective RGB wavelengths are shifted to vary the light wavelengths for the right eye and the left eye. Also, the eyeglasses 7 are composed of optical filters that respectively pass only the right-eye and left-eye wavelengths. In this case, it is possible to correct the shifts of RGB on the left and right by color control on the TV display side, so as to obtain satisfactory color reproduction. This scheme, in which RGB wavelengths are shifted on the left and right, is free from attenuation of the light from the eyeglasses 7 even when the eyeglasses are tilted.

In the system using the rotary mirror 21 as shown in FIG. 4, the display devices 15 to 19 project stereoscopic images from a plurality of view points onto the rotary mirror 21, and the actual stereoscopic images look like real objects even when viewed from varied points of view (in an extreme case, a hidden portion, e.g. on the back, becomes viewable).

Next, an actual stereoscopic view will be described. Reproduced video images utilizing parallax are perceived as shown in FIG. 5 by human eyes. In this case, when the depth from the infinite distance 111 to the eye position 117 is represented in an exploded manner, the individual objects are displayed on the depth planes from the depth positions 112 to 115. For example, the person as a point of attention is seen as a large man 118 when positioned near, and it is seen as a small man 119 when positioned distant. The river 121, as background information, is seen as being larger as it approaches nearer, and it is seen as being smaller as it goes away, while the large mountain 121 is seen as being large though it forms the background. For example, when subtitles are displayed on the stereoscopic video as shown in FIG. 5, they are represented as shown in FIG. 6. The subtitle 122A positioned near gradually moves away as shown by the subtitles 122B and 122C. When the person's depth positions 119A to 119C as a point of attention vary across scenes, eye fatigue can be alleviated by reducing the movement of eye focus, by varying the subtitles in coordination with the variation of the depth position. Thus, it is desirable to display the subtitle 122A in the scene of the person 119A, to display the subtitle 122B in the scene of the person 119B, and the subtitle 122C in the scene of the person 119C. This is based on the fact that stereoscopic video, even though utilizing parallax, requires eye movements in correspondence with the parallax, while conventional 2D video involves no movements of eye muscles in the focus direction because the depth position originally does not vary and the distance between the user and the TV corresponds to the focus of human eyes.

As shown in FIG. 7A, as a point of attention, e.g. a person appearing in the video, moves in the focal direction, eye fatigue occurs in proportion to the acceleration of parallactic angle variation, the time the variation takes, and the number of times that the variation occurs. Especially, a point of attention causes intensive eye fatigue because the eyes have to follow it, and it is thought that the fatigue reaches a peak before the speed of parallactic angle variation, the time of variation, and the number of times become too large. In particular, as shown in FIG. 7B, a near object involves a larger parallactic angle as shown by the viewing angle 126D, while a distant object involves a smaller parallactic angle as shown by the viewing angle 126E. Parallactic angle varies as the distance varies, and then both eyes 126F have to focus to the target at an appropriate angle, in order to follow the variation of parallactic angle caused by the variation of distance. Conventional TVs for displaying flat video do not provide images that vary in the distance direction, and therefore the parallactic angle required for eye perception in the depth direction always remains constant. However, stereoscopic video requires eye movements not only in a flat plane but also in the depth direction (with parallactic angle), resulting in an increased burden on the eyes. However, it is estimated that, when the video has movements faster than eye response, the degree of eye fatigue varies as shown by the curve 126, because the eyes cannot follow the movements and the fatigue decreases. Also, as to the background information, though the eyes originally do not follow it, it is estimated that the fatigue increases as the speed of parallactic angle variation, the time of variation, and the number of times increase as the distance varies. FIG. 8 illustrates this with a relation between the depth-direction acceleration and the product of moving time and the number of times. Even at lower depth-direction accelerations, a dangerous region exists and motion sickness occurs as the number of times and distance increase, but it is estimated that the fatigue does not occur below a certain level even when the product of moving time and number of times increases.

As to the degree of eye fatigue, larger-sized screens require increased eye movements in the plane direction and therefore cause increased eye fatigue. Two evaluation functions are possible accordingly, one with screen-size consideration and the other with no screen-size consideration. First, with an evaluation function 1, a value "a" at which the eyes' following movements can be ignored<parallactic angle variation speed of a point of attention<a range "b" of the eyes' following movements, and the evaluation value (the degree of eye fatigue) is proportional to the value of "parallactic angle variation speed×variation time×the number of times". With an evaluation function 2, a value "a" at which the eyes' following movements can be ignored<parallactic angle variation speed of a point of attention<a range "b" of the eyes' following movements, and the evaluation value (the degree of eye fatigue) is proportional to the value of "parallactic angle variation speed×variation time×the number of times×screen size". The evaluation function 2 is used when the TV screen size is detectable, and the evaluation function 1 is used when it is not detectable. In the second and following preferred embodiments, the evaluation value (the degree of eye fatigue) is described as the degree of depth variation.

In the production of one piece of stereoscopic video, "the amount of variation of parallactic angle", "the time that the variation takes", and "the number of times that the variation occurs" are provided as evaluation factors for the stereoscopic video in that one piece of video content, and it is then possible to make stereoscopic video content by re-encoding it such that the value does not enter the dangerous region 131 of FIG. 7. Also, the degree of depth variation, as an evaluation function, is described in the stereoscopic video content, and it is then possible to present the degree of eye fatigue before the user views the movie, so as to prompt the user to select between 2D reproduction and 3D reproduction. In this case, examples of the re-encoding include: a filming scheme in which parallactic images are filmed with cameras located at a reduced parallactic interval (the distance between the two cameras is reduced); an image-processing scheme in which parallax is reduced by pixel conversion processing using parallax information, as will be described later; and a scheme in which the amount of protrusion (the degree of three-dimensionality) is limited in the production of content by CG for animation etc.

As to the display of subtitles that the user necessarily has to read to understand the story of the movie or the like, it is necessary to place a limitation on the amount of depth-direction variation as shown in FIG. 9. This is because of the fact that, as shown in FIGS. 7 and 8, eye fatigue increases and 3D motion sickness is likely to occur when the eyes follow very fast in the focal direction. Also, it seems that a limitation should be placed also on the distant position of subtitles, because very distant subtitles cause an unnatural impression due to the subtitle size with respect to the background as shown in FIG. 6. A limitation will be necessary also on the near side close to the eyes. This is because positions very near to the eyes involve larger amounts of angular variations of the eyes due to the viewing angle, resulting in an increased degree of eye fatigue. Also, a larger amount of protrusion (in this sense, a representation that is seen as if it protruded very close to the viewer, for example) may "surprise" or "startle" the viewer. Also, it is desirable to place stricter limitations when the TV display has a larger screen, because the eyes have to move more busily in the plane direction, and also because the psychological effects like "surprising" and "startling" also increase. When the reproducing apparatus and the TV are connected in a linked manner, information about the TV screen size is exchanged with the reproducing apparatus, so as to increase the limitations on the range of protrusion of subtitles etc. When a plurality of streams with different amounts of protrusion are provided, the system may be configured such that a stream with a smaller amount of protrusion can be selected when the TV screen is larger, and a stream with a larger amount of protrusion can be selected when the TV screen is smaller, for example. Also, when the amount of protrusion can be varied by a setting on the equipment side, as will be described later, the setting may be automatically made by considering TV size information, the user's conditions (age etc.) and the like.

It is then possible to define stereoscopic video parental levels based on the above-described evaluation value and the maximum amount of protrusion that corresponds to the viewing angle, and then an age limit for viewing may be set, or a warning against danger may be given to elderly or sick people, according to the stereoscopic video parental level. For example, the stereoscopic video parental levels may include Level 1 indicating severe fatigue and danger, with the evaluation value (the degree of eye fatigue)>c, the amount of maximum protrusion>d, and the ordinary parental level being high. Level 2 would indicate relatively severe fatigue and danger, with the evaluation value (the degree of eye fatigue)>c, the amount of maximum protrusion>d, and the ordinary parental level being normal or lower, or with the evaluation value (the degree of eye fatigue)>e, the amount of maximum protrusion>f, and the ordinary parental level being high. Level 3 would indicate intermediate fatigue and danger, with the evaluation value (the degree of eye fatigue)>e, the amount of maximum protrusion>f, and the ordinary parental level being normal or lower. Level 4 would indicate no fatigue and no danger, with the evaluation value (the degree of eye fatigue)>g, the amount of maximum protrusion>h, and the ordinary parental level being normal or lower.

In the above-described example of stereoscopic video parental levels, there is a relation of c>e>g and a relation of d>f>h, and the ordinary parental levels (flat-video parental levels) indicate the restrictions on viewing for ensuring safety that are defined about horror movies and the like in existing 2D video DVDs etc. It will be useful when the setting of such stereoscopic video parental levels can be determined or changed at the time of purchase or at the time of initialization, and can be cancelled and changed at a later time by using an identification number etc.

Second Preferred Embodiment

Next, a second preferred embodiment will be described referring to the drawings. When stereoscopic images utilizing parallax information, as shown in FIGS. 1 to 3, are intactly broadcasted on television, they are displayed like superimposed images. They cannot be viewed without a dedicated stereoscopic display apparatus constructed as described above. Thus, the broadcasting of stereoscopic video is limited by infrastructural facilities of equipment on the viewer side, and it is necessary to provide a dedicated channel that is not intended to be seen by people in general, or to superimpose a flag on the broadcasted information to indicate that it is 3D. Accordingly, it is generally convenient to distribute such stereoscopic video in the form of a recording medium, and to reproduce it with a dedicated player or with a player having this function. Considering such circumstances, methods and formats for storing stereoscopic video in a recording medium will now be described.

Figure 10:
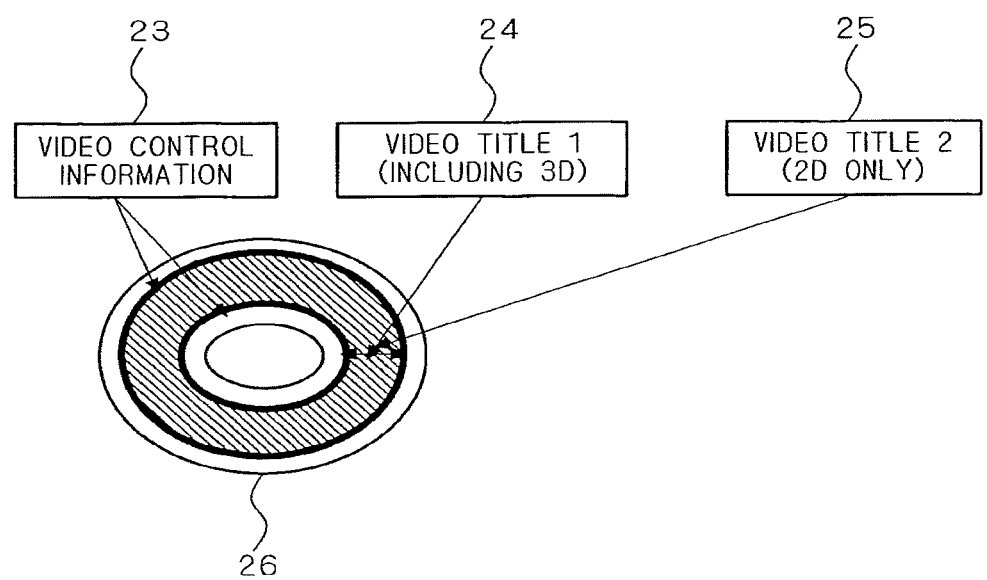
FIG. 10 is a diagram illustrating information recording regions on a recording medium according to a second preferred embodiment of the present invention.

FIG. 10 shows a recording medium 26 according to the second preferred embodiment. The recording media (video media) of this invention can be optical disk media, such as DVDs, BDs, HD-DVDs, MOs, etc., and can also be HDD media, of course. HDDs are usually not portable themselves, but are advantageous in terms of capacity when recording broadcasted stereoscopic video information. On the other hand, optical disk media, such as ROM media, are advantageous for the distribution of stereoscopic killer content before broadcasted or for the distribution of chargeable stereoscopic content. The disk-like recording medium 26 shown in FIG. 10 is divided into a region that stores control info nation about the video information (video control information 23), a region that stores a stereoscopic video (a video title 24), and a region that stores an ordinary 2D video (a video title 25).

Figure 11:
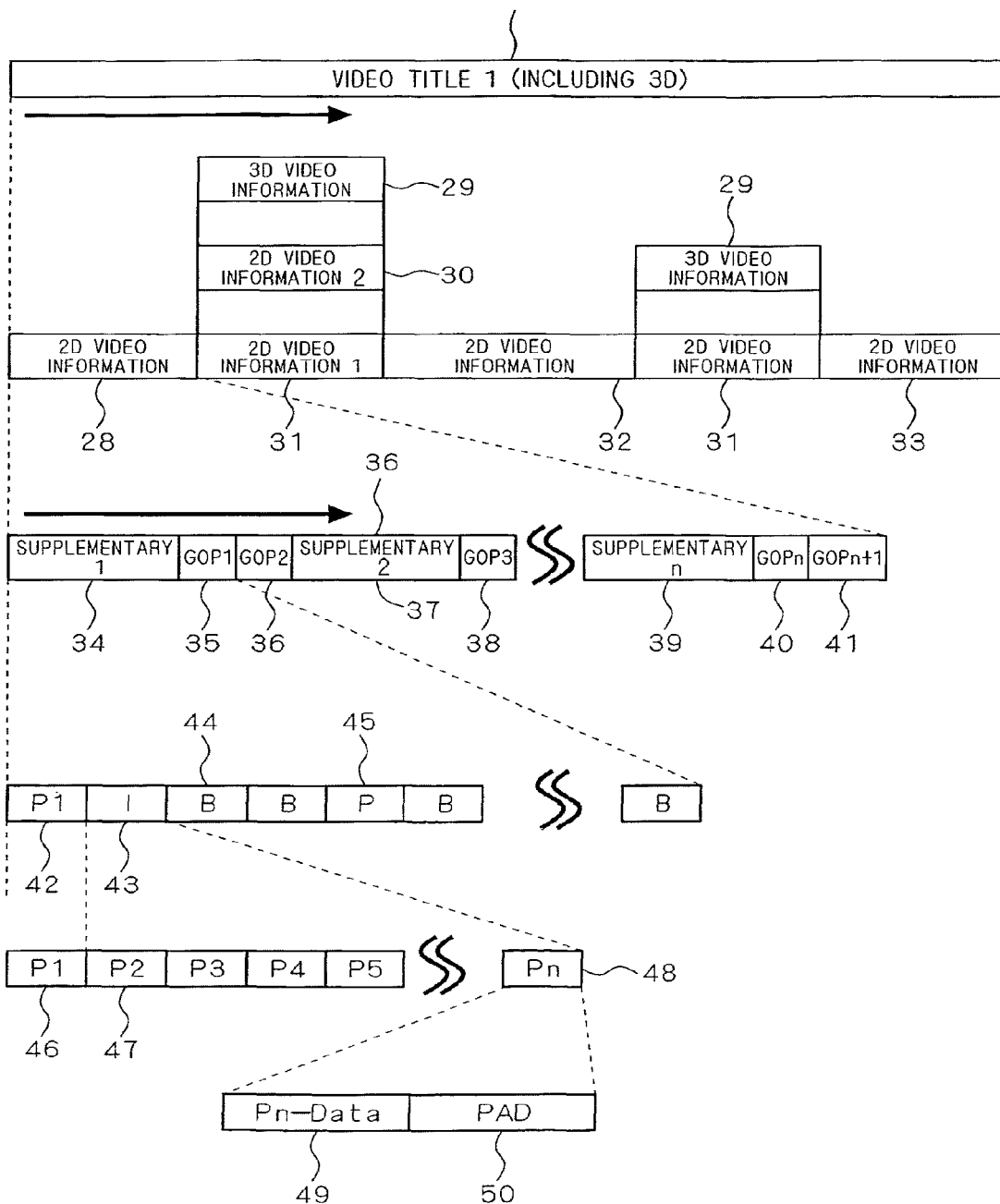
FIG. 11 is a diagram illustrating the structure of a video stream of a video title according to the second preferred embodiment of the present invention.

FIG. 11 is a diagram showing an exemplary structure of the video stream in the region of the video title (video content) 24 of FIG. 10. The video title 27 shown in FIG. 11 includes 2D video information 28, user-selectable 2D video information 30 and 31, 3D video information 29 that is automatically selected or user-selected when the display apparatus is capable of displaying stereoscopic images, 2D video information 32 that is reproduced following the video information 29 to 31, and 2D video information 33 provided at the end of the video title 27. FIG. 11 also shows GOP-layer stream information including a supplementary information region 34 that is located at the head of the following GOP video information 35 and 36 and that describes supplementary information related to the GOP video information, a supplementary information region 37 that is located at the head of GOP video information 38 and that describes supplementary information related to the GOP video information, and a supplementary information region 39 that is located at the head of GOP video information 40 and 41 and that describes supplementary information related to the GOP video information.

FIG. 11 also shows picture-layer stream information including a packet data portion 42 that describes supplementary information, I picture data 43 composed of intra-encoded data, a B picture 44 as encoded data predicted from the I picture data 43 and P picture 45 in the temporal direction, and a P picture 45 as encoded data predicted from the I picture data 43 only in one temporal direction. FIG. 11 also shows a transport packet data layer including a packet 46 as a transport packet data portion that describes supplementary information and that is identical to the packet data portion 42, a first packet 47 carrying the I picture data 43 divided into transport packets, a transport packet 48 storing the last data piece of the I picture data 43, a last portion 49 of the I picture data in the transport packet 48, and a padded portion 50 in the transport packet 48.

Figure 12:
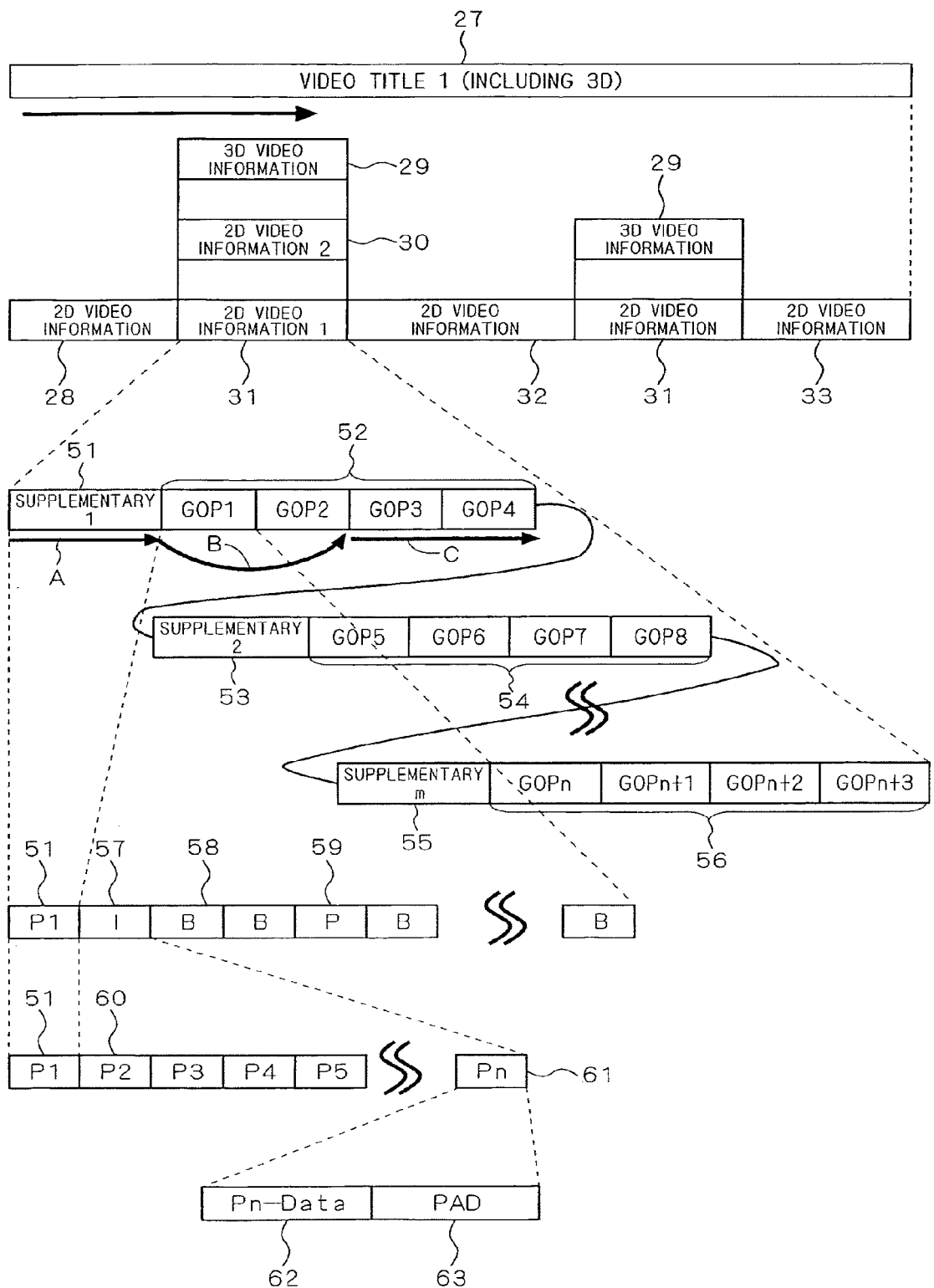
FIG. 12 is a diagram illustrating the structure of the video stream of the video title according to the second preferred embodiment of the present invention.

FIG. 12 illustrates the hierarchical data structure of the region of the video title (video content) 27 where a selection can be made among the 3D video information 29 and the 2D video information 30 and 31. FIG. 12 shows supplementary information 51 that is located at the head of the region where the 3D video information 29 and 2D video information 30 and 31 are selectable and that stores information related to the video sequence, a GOP video information sequence 52 in this region, supplementary information 53 that stores information related to a GOP video information sequence 54, and supplementary information 55 that stores information related to the GOP video information sequence 56 at the last of this region. FIG. 12 also shows picture layer stream information including I picture data 57 composed of intra-encoded data, a B picture 58 as encoded data that is predicted from the I picture data 57 and P picture 59 in the temporal direction, and a P picture 59 as encoded data that is predicted from the I picture data 57 only in one temporal direction.

Figure 13:
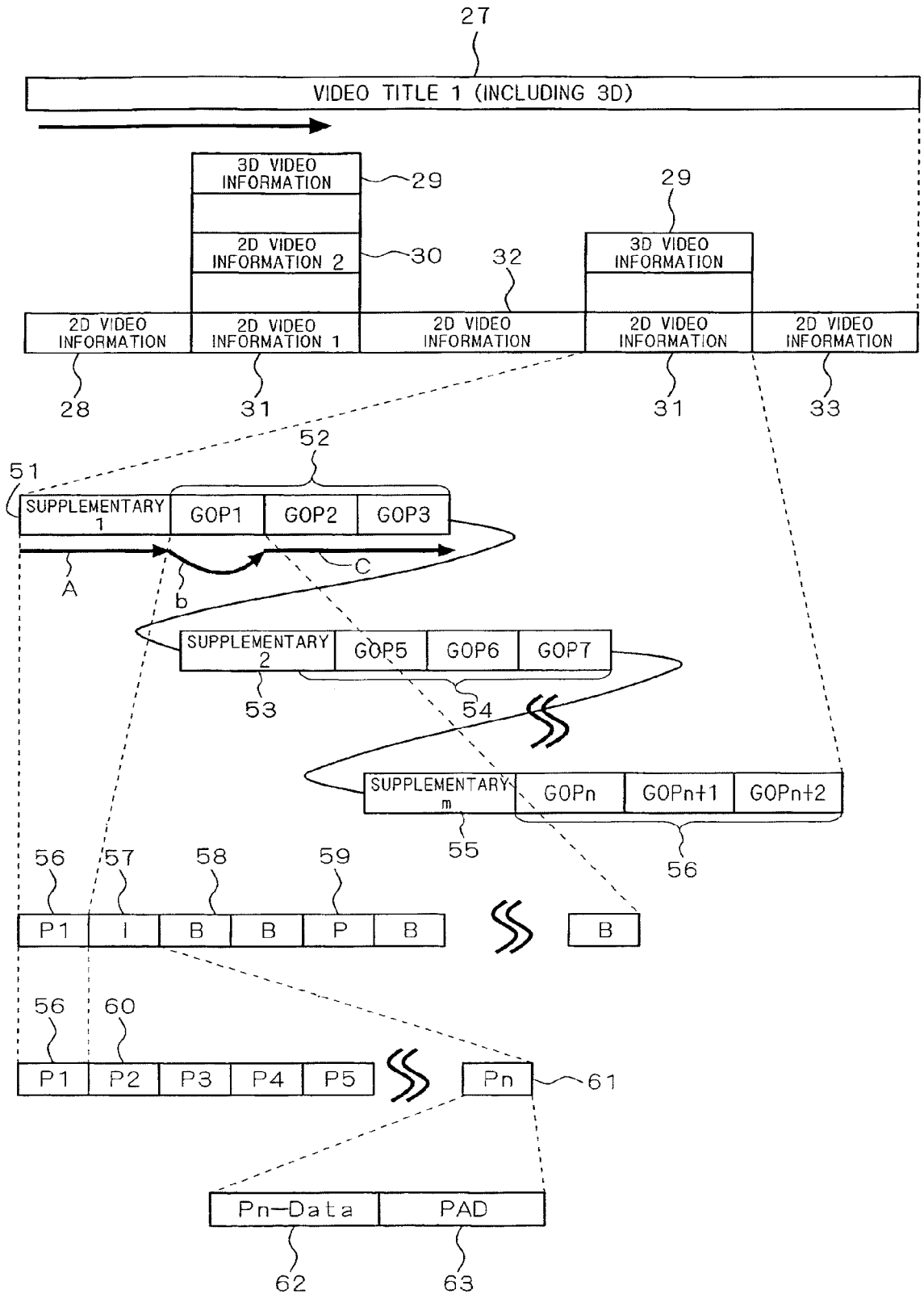
FIG. 13 is a diagram illustrating the structure of the video stream of the video title according to the second preferred embodiment of the present invention.

FIG. 12 also shows a transport packet data layer including a first packet 60 carrying the I picture data 57 divided into transport packets, a transport packet 61 storing the last data piece of the I picture data 57, a last portion 62 of the I picture data in the transport packet 61, and a padded portion 63 in the transport packet 61. Also, in FIG. 12, the arrow A indicates a reproduced portion, the arrow B indicates a portion that is skipped when 3D reproduction is performed, and the arrow C indicates a portion that is reproduced for 3D reproduction, where right-eye GOP video information and left-eye GOP video information are provided. FIG. 13 illustrates the hierarchical data structure of the region of the video title 27 where a selection can be made between the 3D video information 29 and the 2D video information 31. This structure is basically the same as that of FIG. 12, and therefore like components are designated by like reference characters and not described again here.

Now, as shown in FIG. 10, the structure of data recorded in an optical disk or HDD medium includes a region for the video control information 23 for recording video-related supplementary information, sequences, etc., and a region for actual video titles (video content) 24, 25. In this case, 3D video is not always totally 3D from the beginning to the end, but it may be a mixture of 3D and 2D, or such video streams may be switchable by user selection. In particular, DVD standards allow for display of user-selectable and switchable video information streams, such as multi-angle, and 3D video information is produced by additionally constructing a 3D video stream on a 2D video stream, since users' facilities are not always 3D-compatible. When a user's display equipment is compatible with 3D, it may be automatically recognized, e.g. by the link function of HDMI terminal, and a 3D video stream may be displayed selectively, or the user may operate a button to select and display 3D video. Needless to say, some content may be totally 2D or 3D, but consideration should be given to such composite formats.

It is desired that supplementary information regions about the video information stream of the video title 24 be provided also on the video information stream, so as to allow access to the information, management of the information, switching of settings of equipment, etc. In particular, when content includes a mixture of 2D and 3D video streams, it is necessary on the TV side to detect whether the video stream is 2D or 3D. When supplementary information regions are provided on the stream, the settings on the TV side can be readily and automatically changed on the basis of the information. When a player/recorder for reproducing/recording a recording medium controls all settings in a closed manner, it will be satisfactory to describe the control information only in the video control information 23 where the control information is collectively recorded in a part of the disk. However, when it is connected to a TV, especially when the TV is switched in the course of reproduction, superimposing necessary minimum control information on the video information itself allows the settings on the TV side to be automatically switched. When such control information is absent in the video information, the procedure requires detecting the switching of TV, separately sending control information from the player/recorder, changing the settings on the TV side, and then sending the video information. Needless to say, as to the change of settings on the TV side, it is necessary to provide a mechanism for quickly changing the settings of the display apparatus, since the stereoscopic video reproduction processing itself, like the switching of polarized light, is conducted on the display apparatus side.

The supplementary information 51 can be used also for access and management of information, and it has become established as Navi information in DVD standards. When both 2D video and 3D video exist in a mixed manner, they exist in parallel in the time sequence of the content, as shown by the 3D video information 29 and 2D video information 30 and 31 in FIG. 11. Accordingly, the first supplementary information 34 should be located at the head of the GOP data information group. Then, by reading the contents of the supplementary information first, it is possible to know whether the information of the next GOP sequence is 2D or 3D, and if it is 3D, it is possible to know whether it is for the left eye or for the right eye, and to know their locations in the GOP video information group (where to access). The GOP video information group having the supplementary information 51 at the head is defined as a video unit that is larger than the GOP video information.

In the case of video information data that is compressed also in the temporal direction, such as by MPEG, the information exists in units of GOP information having an I picture at the beginning, and therefore access to the video data has to be made in units of GOP video information. Also, the supplementary information, which has to be read in the first place, should be located at the head of the GOP video information group. For example, when a 3D video information portion is reproduced as shown in FIG. 12, the supplementary information 51 is reproduced first (the arrow A in the diagram), and the 2D video information 30 and 31 are skipped, and then the 3D video information 29 is reproduced. In this way, the 2D video information 30 and 31 are skipped as shown by the arrow B so that the memory of the reproducing equipment does not capture unnecessary information (the 2D video information 30 and 31 in this case) and an increase of unwanted storage is avoided, and then the 3D video information 29 is reproduced as shown by the arrow C without interruption of video.

At the picture layer underneath, the supplementary information 51 at the beginning of GOP video information is located before the I picture 57. Also, in the lowermost-layer data, the compressed video data is divided into transport packets 60, 61 as shown in FIG. 12, since dividing compressed video data into transport packets is convenient to provide compatibility with digital broadcasts such as groundwave, satellite, and cable digital broadcasts. In this case, too, the supplementary information 51 is described in the transport packet at the head of the GOP video information group 52. Needless to say, a private packet that has been newly defined for transport packets is used. In the transport packet 61 at the end of the I picture 57, the data does not always end to fit the fixed transport packet unit, and so it is preferable to pad the last portion 63 with "00" or "FF" so that the packet data completes to fit the GOP video information unit. When the sequence branches out into two streams including one 2D video stream 31 and one 3D video stream 29 as shown in FIG. 13, the arrow B skips a smaller amount of GOP video information than in FIG. 12, but the operation is basically the same as that shown in FIG. 11.

The contents of the supplementary information will be described in more detail. The supplementary information 51 shown in FIG. 14 includes content information 64, time code 65, location information 66, information 67 about video information, information 68 about audio information, and information 69 about OSD information. The content information 64 shown in FIG. 14 includes content name 70, copyright 71, encryption information 72, presence/absence of 3D images 73, and available region information 74.

Figure 15:
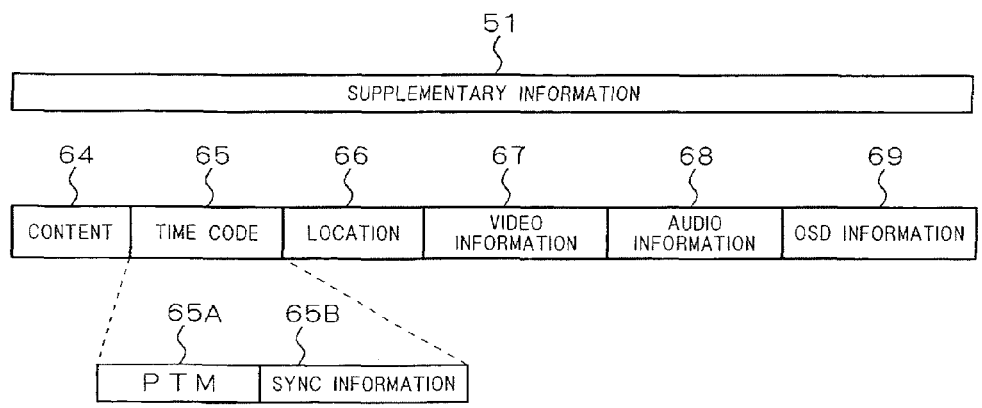
FIG. 15 is a diagram illustrating time code information in the supplementary information according to the second preferred embodiment of the present invention.

The time code information region 65 shown in FIG. 15 includes presentation time 65A and synchronization information 65B. The location information 66 shown in FIG. 16 includes seamless information 75, jump destination information 76, angle information 77, and in-GOP location information 78. The video information 67 shown in FIG. 17 includes resolution information 79, frame rate information 80, 3D video information 81, parental information 82, angle information 83, encryption information 84, information 85 about 3D video scheme and presence/absence, 3D video frame rate information 86, number of 3D video information 87, information 88 about depth resolution, information 89 about the degree of depth variation, information 90 about permitted subtitle depth, information 100 about depth limitations, and information 101 about parallax limitations.

Figure 18:
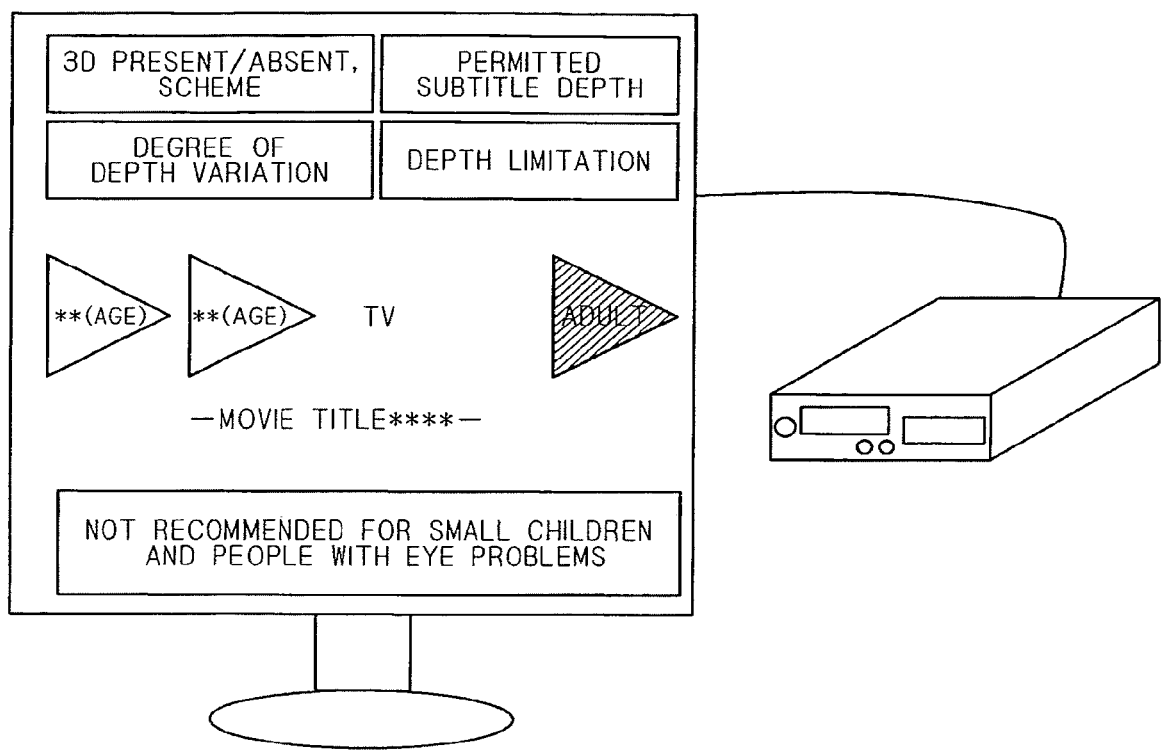
FIG. 18 is a conceptual diagram illustrating a TV display using the supplementary information according to the second preferred embodiment of the present invention.
Figure 19A:
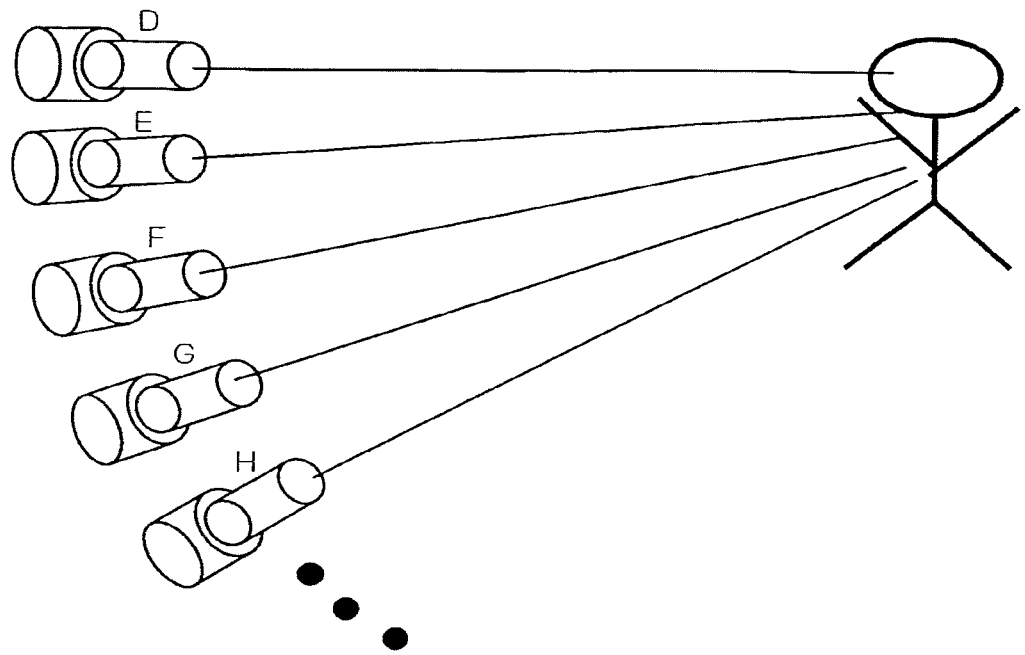
FIGS. 19A and 19B are schematic diagrams used to illustrate multi-angle information according to the second preferred embodiment of the present invention.
Figure 19B:
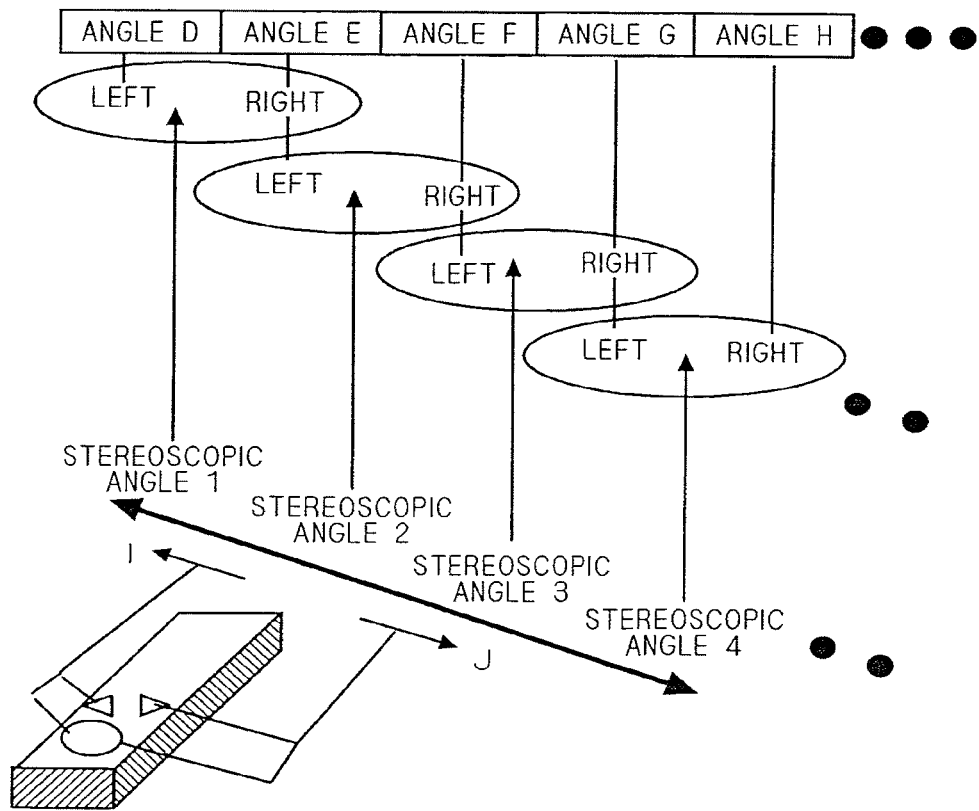

FIG. 18 is a schematic diagram illustrating display of the supplementary information on a TV as a display apparatus. FIGS. 19A and 19B are schematic diagrams illustrating a multi-angle filming with a plurality of cameras. The OSD information 69 shown in FIG. 20 includes OSD location information 69A, OSD storage location information 69B, font and character size designation 69C, in-plane OSD location information 69D, depth-direction OSD location information 69E, depth position 69F, permitted-depth limitation 69G, and depth zooming speed 69H.

Figure 14:
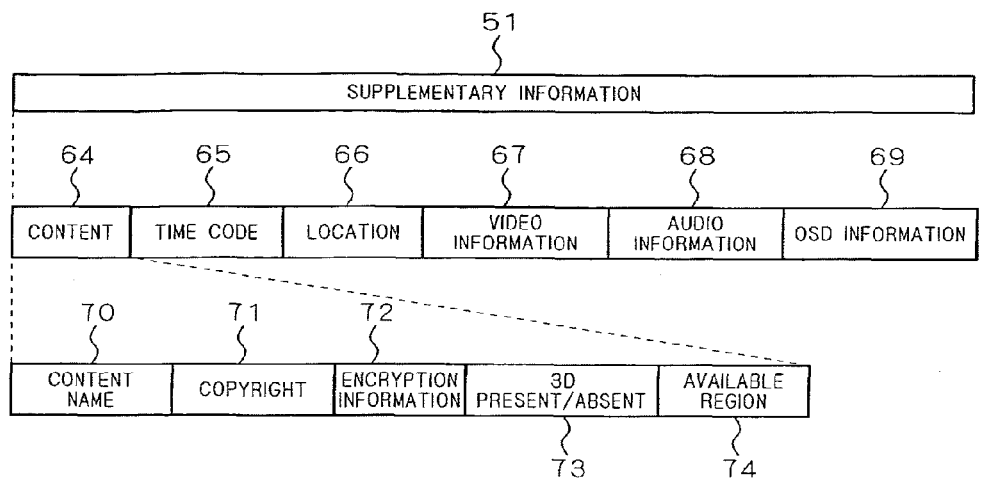
FIG. 14 is a diagram illustrating content information in the supplementary information according to the second preferred embodiment of the present invention.

Now, the supplementary information 51 shown in FIG. 14 is first described for each GOP video information group on the stream, and it is sent together with the video information in HDMI transmission to a TV etc. Accordingly, needless to say, it includes information necessary for settings on the TV side, especially about 3D video display.

Next, the content information 64 shown in FIG. 14 will be described. The content name information 70 may be displayed as OSD information on the TV side, including (1) content name, (2) cast, (3) time of production, (4) distributor, (5) names of relevant works, and (6) summarized story. When the supplementary information 51 superimposed on the video stream is included, it is possible to display the contents of the content name information 70 even when the input on the TV side is switched to 3D video information in midstream.

The copyright information 71 shown in FIG. 14 describes (7) copyright owner, (8) distributor, (9) importer, and (10) capital participant, whereby the information about the copyright owner of the video stream can be distributed at the same time, allowing the copyright owner to claim against illegal use of the reproduced data. Also, since this information is superimposed on the video stream, it is always distributed to the TV side and the copyright information can be displayed even when the TV is changed.

The encryption information 72 shown in FIG. 14 includes (11) presence/absence of encryption and (12) encryption scheme, whereby the destination equipment can be informed whether the information is encrypted and requires a high level of security, or the information requires no security, like commercials.

The 3D video information 73 shown in FIG. 14 describes (13) whether ready for 3D, (14) whether ready for totally 2D display (whether it can be reproduced to the end only with 2D video display), and (15) when 3D-ready, whether 3D video reproduction has priority, whereby information can be displayed to the user of a 3D-incompatible TV to let him know that his TV is 3D-incompatible. Also, when link-connected with a TV by HDMI, it is possible to automatically switch the TV side to 3D (for example, to automatically display two video streams field by field as shown in FIGS. 1 and 3). When the TV side does not have a 3D video function, measures can be taken by indicating, on the TV or reproducing apparatus side, that the TV is incompatible, or by ejecting the disk, for example.

The available region 74 shown in FIG. 14 can describe (16) a 2D video reproduction permitted region and (17) a 3D video reproduction permitted region, whereby it is possible to permit the reproduction of this disk only in a limited region, and also to permit 2D only and permit 3D compatible display only in a limited region. This is because, in some cases, 2D video reproduction only is permitted in a particular region when the conditions for license about 3D video reproduction are not established. In a region where 3D video reproduction is not permitted, measures can be taken by allowing even a 3D video display apparatus to reproduce 2D video only, or by ejecting the disk, for example.

Next, the time code information 65 shown in FIG. 15 will be described. With video content that contains a mixture of 2D and 3D, even when the user gives an instruction for switching in midstream (from 3D to 2D, for example), it is necessary to continuously reproduce the video information without interruption or omission. Also, the user may give an instruction for a time search to move forward or backward, e.g. to 10 minutes before. It is therefore necessary to record the presentation time 65A at the beginning of the GOP video information group, so as to provide reproduction time information from the start of the video title. It is possible to display the remaining time on the TV side, by recording information about the remaining time to the end of the reproduction of the title, or the total title reproduction time.

Also, 3D video is likely to cause eye fatigue etc. as described in the first preferred embodiment. Accordingly, it is possible to give an instruction to take a break to prevent eye fatigue, or to warn about the danger, by displaying a time code from the start of 3D video reproduction (how long 3D video has been viewed continuously), or by displaying how long 3D video has been viewed in total in this video content. Also, when there are right-eye and left-eye GOP video information for 3D, it is possible to make field designation corresponding to the order of reproduction. That is, the presentation time 65A describes (18) a time code from the start of the title (presentation time), (19) information about the remaining time to the end of the reproduction of the title, or a total title reproduction time, (20) a time code from the start of 3D video reproduction (3D presentation time), (23) total 3D reproduction time, and (24) the order of reproduction of right-eye and left-eye images or field designation. The synchronization information 65B defines the synchronization of the video content, by the order of reproduction of right and left images or by field designation.

Next, the location information 66 shown in FIG. 16 will described. In particular, when video content includes both 2D and 3D in a mixed manner, it is necessary to describe location information about GOP video information groups, in order to skip information unnecessary for reproduction or to move to the beginning of required data. Also, in the case of special reproduction operation, it is necessary to consider the requirement that access has to be first made to an intra-compressed picture, because of the characteristics of temporally-compressed video, such as by MPEG. Accordingly, the seamless information 75 records (25) absence/presence of seamless reproduction (to the next GOP video information group). Also, the jump destination information 76 records (26) jump destinations' (forward and backward) address 1, address 2, etc., (27) jump destinations' time code information 1, time code information 2, etc. (having multiple pieces of jump destination information as table information), and (28) presence/absence of 3D video information at jump destinations. When the information of (28) presence/absence of 3D video information at jump destinations indicates the absence of 3D video information at the jump destination, the setting of the TV can be returned to 2D during the reproduction of the stream.

The angle information 77 records (29) GOP video information address 1, address 2, etc. that correspond to a plurality of angles, and (30) time code information 1, time code information 2 etc. about the GOP video information corresponding to a plurality of angles. The in-GOP location information 78 records (31) address information 1, address information 2 etc. as location information about P pictures in each GOP. Thus, the presence of the seamless information 75 enables sequential reproduction by connecting necessary angles, and the location information in GOPs enables fast forward and fast reverse reproduction by reproducing I pictures only or I and P pictures only.

Next, the video information 67 shown in FIG. 17 will be described. In the video information 67, the pieces of information shown below are especially necessary as stereoscopic video information. First, the resolution information 79 records (32) a resolution of 2D video reproduction (in-plane direction), a resolution of PinP images (in-plane direction), and (33) a resolution of 3D reproduction (in-plane direction). The 3D video presence/absence and scheme 85 records (34) presence/absence of 3D and (35) designation about the 3D video scheme (scan-doubling rate designation, presence/absence of the use of polarizing eyeglasses, presence/absence of the use of a liquid-crystal shutter mechanism). The 3D frame rate 86 records (36) a 2D video reproduction frame rate and a 3D video reproduction frame rate.

The number of 3D video information 87 records (37) the number of independent 3D video information streams that are reproduced in parallel. When there are n different angles, it is described as n=angle number. On the basis of this information, the number of angles is displayed during reproduction, and it is possible to switch the angle by user selection, and to recognize the angle numbers through display. The number of 3D video information 87 also records (38) the number of video streams and camera information about right and left images that are sequentially switched. For example, as shown in FIG. 19A, when images are taken by using cameras D to H having five shifted parallaxes, or when an animation is recorded by CG as five pieces of parallactic video information, this number and the intervals between the cameras or their angles are described. For example, the supplementary information is described as "general information—the number of video streams is five—the camera interval is ** mm", "camera D's image 1—angle 1", "camera E's image 2—angle 2", "camera F's image 3—angle 3", "camera G's image 4—angle 4", and "camera H's image 5—angle 5".

When there are five video streams with shifted parallaxes, it is possible, as shown in FIG. 19B, to reproduce four stereoscopic angle video streams with slightly different angles with the five pieces of parallactic video information, with the angle D as the left image of the stereoscopic angle 1, the angle E as the right image of the stereoscopic angle 1 and the left image of the stereoscopic angle 2, the angle F as the right image of the stereoscopic angle 2 and the left image of the stereoscopic angle 3, and the angle G as the right image of the stereoscopic angle 3 and the left image of the stereoscopic angle 4, and the angle H as the right image of the stereoscopic angle 4. It is also possible to rotate images by sequentially shifting the angle information. Thus, one video stream does not indicate one angle information, but new angle information can be constructed by combining images having adjacent parallactic angles. In recent years, with the progress of CG techniques, it is easy to produce stereoscopic images in animation, and the point of view can be changed by shifting the angle, by preparing parallactic information of multiple angles and accessing the information according to the user's indication from a remote controller.

The depth resolution 88 records (39) 3D video depth resolution 1, resolution 2, etc. When there are a plurality of 3D video streams, it describes a plurality of depth-direction resolutions. For example, in CG video, when the depth resolution is extremely low and the image does not move smoothly in time, the depth can be complemented in the temporal direction on the basis of this information so as to produce smooth display. The degree of depth variation 89 records (40) the degree of 3D video depth variation 1, the degree of variation 2, etc. When there are a plurality of 3D video streams, a plurality of depth-direction variation degrees are described. In particular, the degree of variation is closely related to the fatigue of human eyes as described in the first preferred embodiment, and it is recorded to ensure safety, and can be utilized to give a warning to the user, or to instruct the user to take a break, for example.

The permitted subtitle depth 90 records (41) the range of permitted subtitle depths (maximum viewing angle 1, minimum viewing angle 1, maximum viewing angle 2, minimum viewing angle 2, etc.). When there are a plurality of 3D video streams, a plurality of depth-direction variation degrees are described. Subtitle information is likely to affect eye fatigue, because the focus must be frequently adjusted alternately to the subtitles' focus position and the point of attention during the viewing of stereoscopic video as described later, and it is therefore necessary to sufficiently limit the range of display. Also, when the depth information is described in terms of real distance, it is difficult to represent it in numerical form because the far side is at an infinite distance, and therefore it is desirable to describe it in tends of viewing angle information. Also, it has no meaning to represent near-infinite distances with detailed numerals, and therefore a lower limit may be set, e.g. by omitting viewing angles of 1 degree or less. The player sets the depth positions of subtitles in OSD display on the basis of these pieces of information.

The depth limitation 100 records (42) depth limitation (maximum viewing angle 1, maximum viewing angle 2, etc.). When a stereoscopic image protrudes or moves extremely forward, it will cause a psychological impression like "surprising". Accordingly, the amount of protrusion of stereoscopic images, not of subtitles, is limited, so that the images are soft for the eyes or so that the images will not surprise the viewer too much. In this case, in the player, viewing angles corresponding to the maximum amounts of protrusion are previously recorded in the video content as shown in FIG. 17, making it possible, as shown in FIG. 18, to give a warning to young children, or to indicate restrictions on the viewing.

The parallax limitation 101 describes (43) limitations of the amount of parallax (for filming, maximum viewing angle 1, minimum viewing angle 1, maximum viewing angle 2, minimum viewing angle 2, etc.). When there are a plurality of 3D video streams, a plurality of depth-direction variation degrees are described. This information corresponds to the distance between two cameras during filming. The amount of reference parallax differs depending on the interval between human eyes, and this information defines the range of reference angles. It is thus possible to previously grasp the degree of discomfort that a small child, having a short interval between the eyes, would feel when viewing the video.

Thus, it is possible to alleviate discomfort by preparing video content that contains a plurality of stereoscopic video streams with different reference parallax values so that a selection can be made on the basis of the interval between the viewer's eyes. In animation and the like, recent innovative CG techniques are capable of easily changing the reference parallax value with a computer. In this case, such parallax value limitation information is described in the supplementary information, whereby the player can provide select buttons, e.g. indicating " (age)", " (age)", and "adult", as shown in FIG. 18, and then a selection can be made with the buttons so that the reference parallax value of the original video content can be adapted to the viewer to present proper stereoscopic viewing. It is also possible to avoid eye fatigue etc. that would be caused by the viewing of video with improper parallax for a long time. Also, the parental 82 defines a stereoscopic video parental level for 3D viewing, as well as an ordinary flat-video 2D parental level. The parental 82 records (44A) a flat video parental level (a parental level like those defined for existing DVDs) and (44B) a stereoscopic video parental level (a stereoscopic video parental level as described in the first preferred embodiment).

Figure 20:
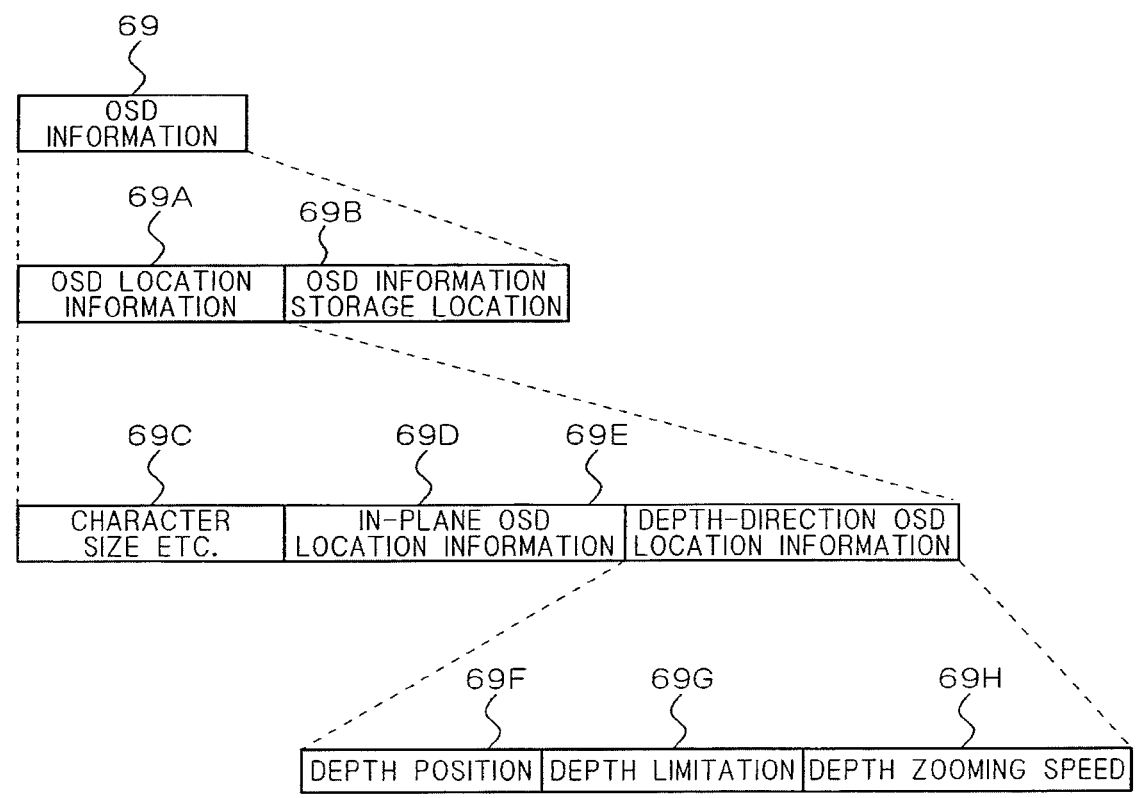
FIG. 20 is a diagram illustrating OSD information according to the second preferred embodiment of the present invention.

As shown in FIG. 20, the OSD information 69 records, first, location information 69A as supplementary information about the OSD itself, and OSD information storage location 69B describing addresses where the information about the OSD itself is stored. With the OSD display 69, the supplementary information is first captured and understood by a microcomputer etc., and then the actual OSD is obtained and displayed on the basis of the storage location information.

The information 69C about character size etc. records (45) character font, character size. The in-plane location information 69D records (46) character location information (X position, Y position).

The depth-direction OSD location information 69E records (47) depth position 69F, (48) permitted-depth limitation 69G (limitations for alleviating eye fatigue as described in the first preferred embodiment, such as a far-side limit position, a near-side limit position, a limitation on the amount of depth variation, etc.), and (49) depth zooming speed 69H (presence/absence of zooming, zooming speed). The depth zooming speed 69H defines zooming to alleviate eye fatigue, by gradually zooming from a certain subtitle to the next subtitle, instead of instantaneously varying the depth position.

The above-described pieces of supplementary information from (1) to (49) about 3D video information are superimposed on the video information stream and distributed together with the video information, and similar descriptions can be recorded also in the video control information 23 in a region separate from the video information itself, as described below. This allows all information to be read at the time when the player is started, and thus enables various initializations to be made. This also enables descriptions of more detailed control information, since a larger amount of information can be described regardless of bit rate and memory limit, than when it is superimposed on the video information.

Figure 21:
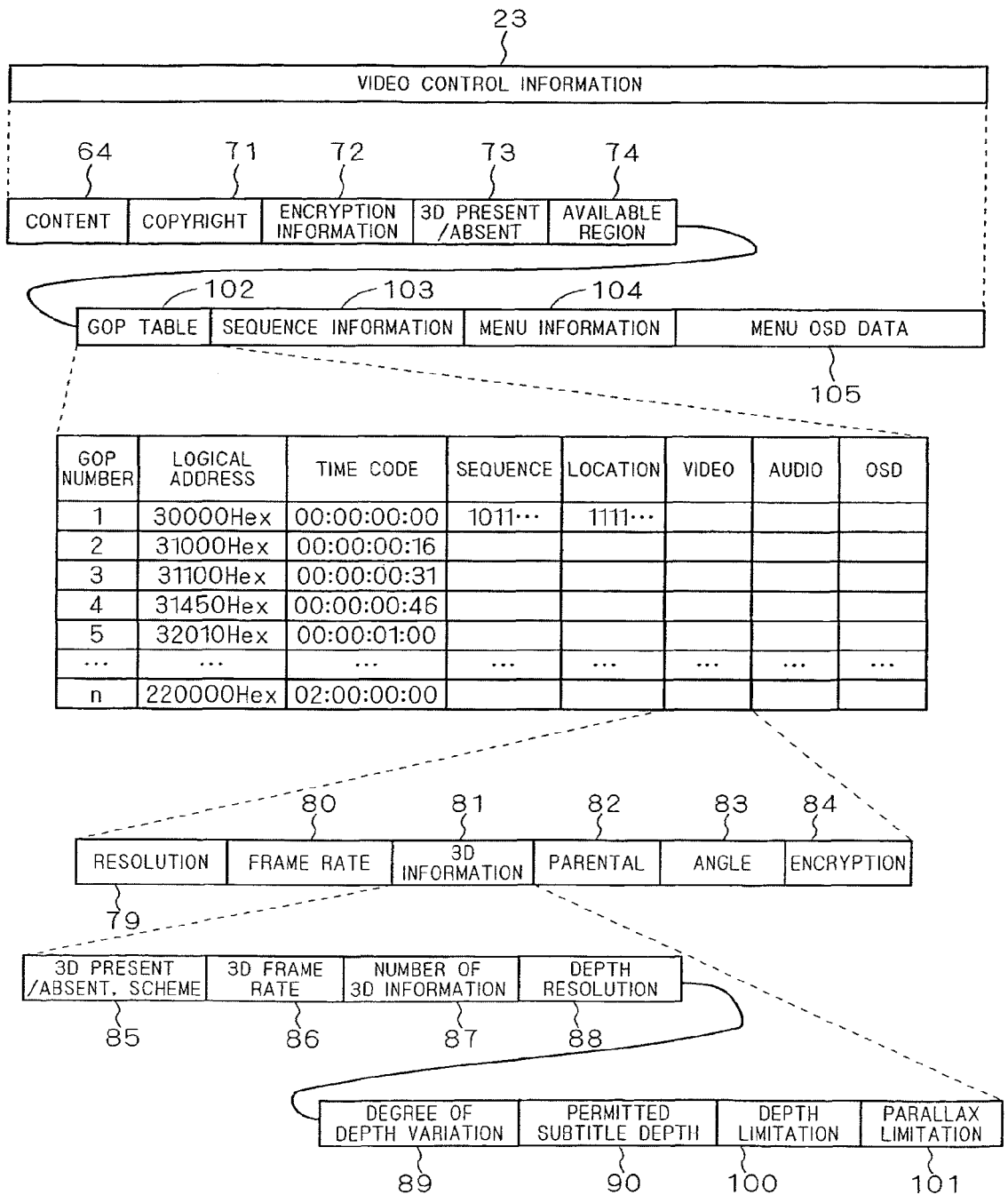
FIG. 21 is a diagram illustrating GOP table information in the video control information according to the second preferred embodiment of the present invention.

Next, the structure of control information recorded in a certain region on the recording medium separately from the video information will be described. FIG. 21 is a diagram illustrating the details of a GOP table portion of collectively recorded video control information 23, and FIG. 21 also shows the video-related information recorded therein. The video control information 23 shown in FIG. 21 includes content information 64, copyright 71, encryption information 72, presence/absence of 3D images 73, available region information 74, GOP table information 102, sequence information 103, menu information 104, and menu OSD data 105. The GOP table information 102 is described in the form of a table as shown in FIG. 21, having sections for GOP number, logical address, time code, sequence, location, video, audio and OSD.

In particular, FIG. 21 shows the structure of the video section, which includes resolution information 79, frame rate information 80, 3D video information 81, parental information 82, angle information 83, and encryption information 84. FIG. 21 also shows that the 3D video information 81 includes 3D scheme and presence/absence information 85, 3D video frame rate information 86, the number of 3D video information 87, depth resolution information 88, depth variation degree information 89, permitted subtitle depth information 90, depth limitation information 100, and parallax limitation information 101.

Figure 22:
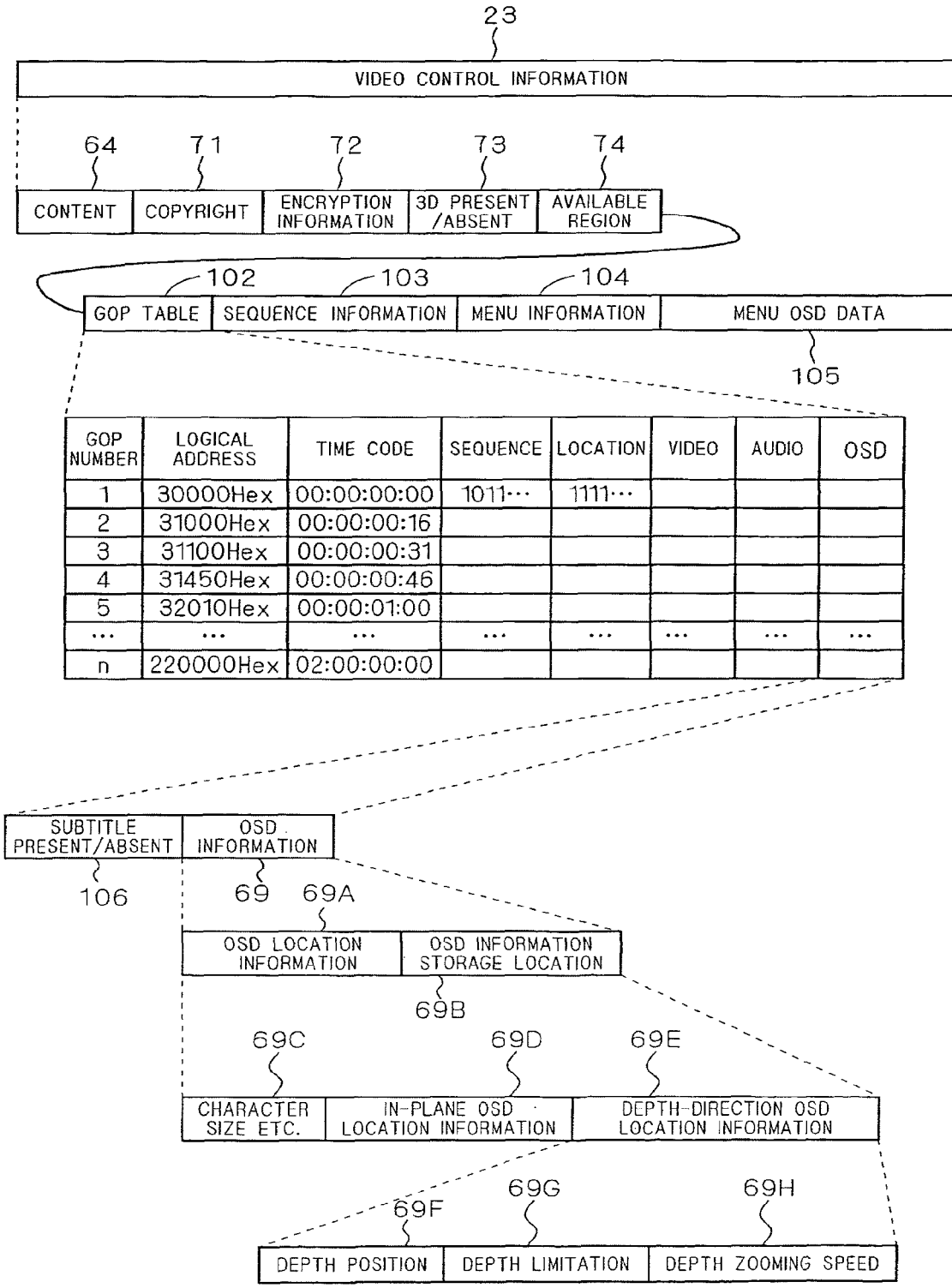
FIG. 22 is a diagram illustrating the GOP table information and OSD information in the video control information according to the second preferred embodiment of the present invention.

FIG. 22 is also a diagram illustrating the GOP table portion of the collectively recorded video control information 23, and FIG. 22 shows the details of the video-related information recorded therein. In particular, FIG. 22 shows the structure of the OSD section, including presence/absence of subtitles 106 and OSD information 69. The OSD information 69 includes OSD location information 69A and OSD storage location information 69B, where the OSD location information 69A includes font and character size designation 69C, in-plane OSD location information 69D, and depth-direction OSD location information 69E, and the depth-direction OSD location information 69E includes depth position 69F, permitted-depth limitation 69G, and depth zooming speed 69H.

Figure 23:
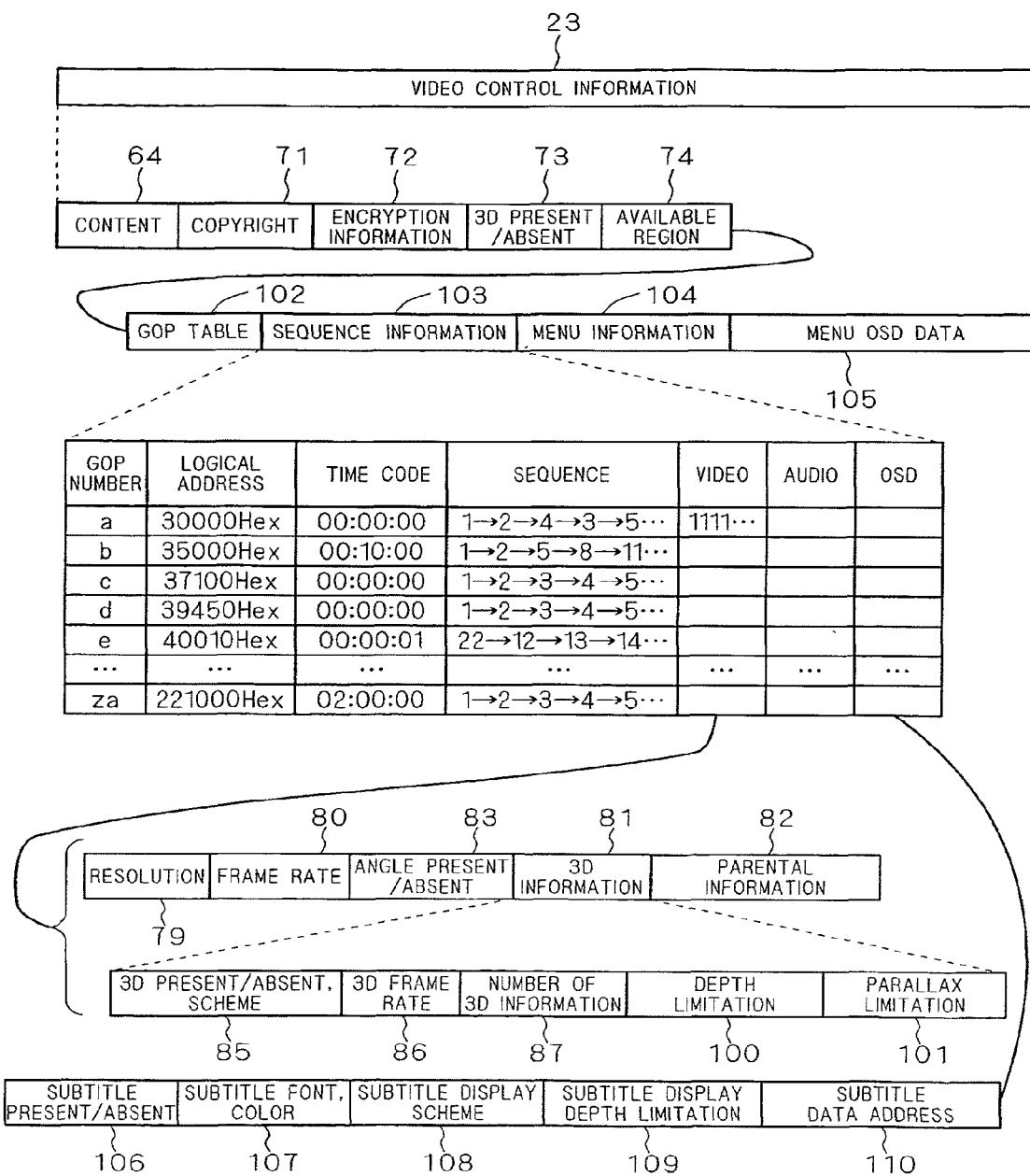
FIG. 23 is a diagram illustrating sequence information, OSD information, and video attribute information in the video control information according to the second preferred embodiment of the present invention.

FIG. 23 illustrates the structure of the sequence information in the video control information collectively recorded in a region of the recording medium separately from the video information, and FIG. 23 illustrates that the sequence information 103 is recorded in the form of a table. The video section of FIG. 23 includes resolution information 79, frame rate information 80, angle information 83, 3D video information 81, and parental information 82. The 3D video information 81 includes 3D video scheme and absence/presence information 85, 3D video frame rate information 86, the number of 3D video information 87, depth limitation information 100, and parallax limitation information 101. The OSD section of FIG. 23 records presence/absence of subtitles 106, subtitle font, color 107, subtitle display scheme 108, subtitle depth limitation 109, and subtitle data address 110.

The control information located in a certain region of the recording medium separately from the video information describes all information including the supplementary information 34, 51 that are superimposed on the video information stream. By this, the control information is read first when the player/recorder is started so that various initializations can be made.

First, the video control information 23 is described as shown in FIG. 21. Like the supplementary information 51 superimposed in the video information of FIG. 14, it includes content information 64, time code 65, location information 66, information 67 about video information, information 68 about audio information, and information 69 about OSD information. However, in the video control information 23 where a larger amount of information can be stored, it is possible to describe table information about all GOPs, like the GOP table 102, and so the contents of the information can be grasped in units of GOP video information without reproducing the video. The GOP table 102 is described like the table of FIG. 21, including logical addresses, and so data file identification information can be detected from a signal read from a given sector region, by utilizing the logical addresses. Then, on the basis of the detected data file identification information, the position of a data file recorded on the disk medium is identified. The data file corresponds to an encoded unit located at the position indicated by the position identification signal. Then, the data file is read on the basis of the identified position on the disk medium, and the video signal encoded in the unit in the read data file is decoded, and can thus be reproduced. Thus, for reproduction, the position where a certain video signal encoded in the unit is recorded can be readily and instantaneously specified at a desired point of time.

The supplementary information about video in the GOP table 102 includes 3D video information, and the same items as the items (32) to (43) described in the video stream can be described for each piece of GOP video information. Also, as shown in FIG. 22, the subtitle information describes the presence/absence of subtitles 106, the OSD information 69 (OSD location information 69A~depth zooming speed 69H), and thus the same information as the information (44) to (49) can be described as supplementary information about subtitles for each piece of GOP video information.

Also, as shown in FIG. 23, the video control information 23 can also describe sequence information for each piece of GOP video information. Thus, at the start of reproduction, an address is generated about a certain sector region where information about the order of data file reproduction is recorded, and the reproduction order information is read from the data read by data reading means, so as to detect the reproduction order information, and then the order of sector addresses are generated on the basis of the reproduction order information. It is thus possible to reproduce video signals recorded in sectors that are distributed on the recording medium. The sequence table information can also describe the supplementary information shown as (32) to (49).

Third Preferred Embodiment

Figure 24:
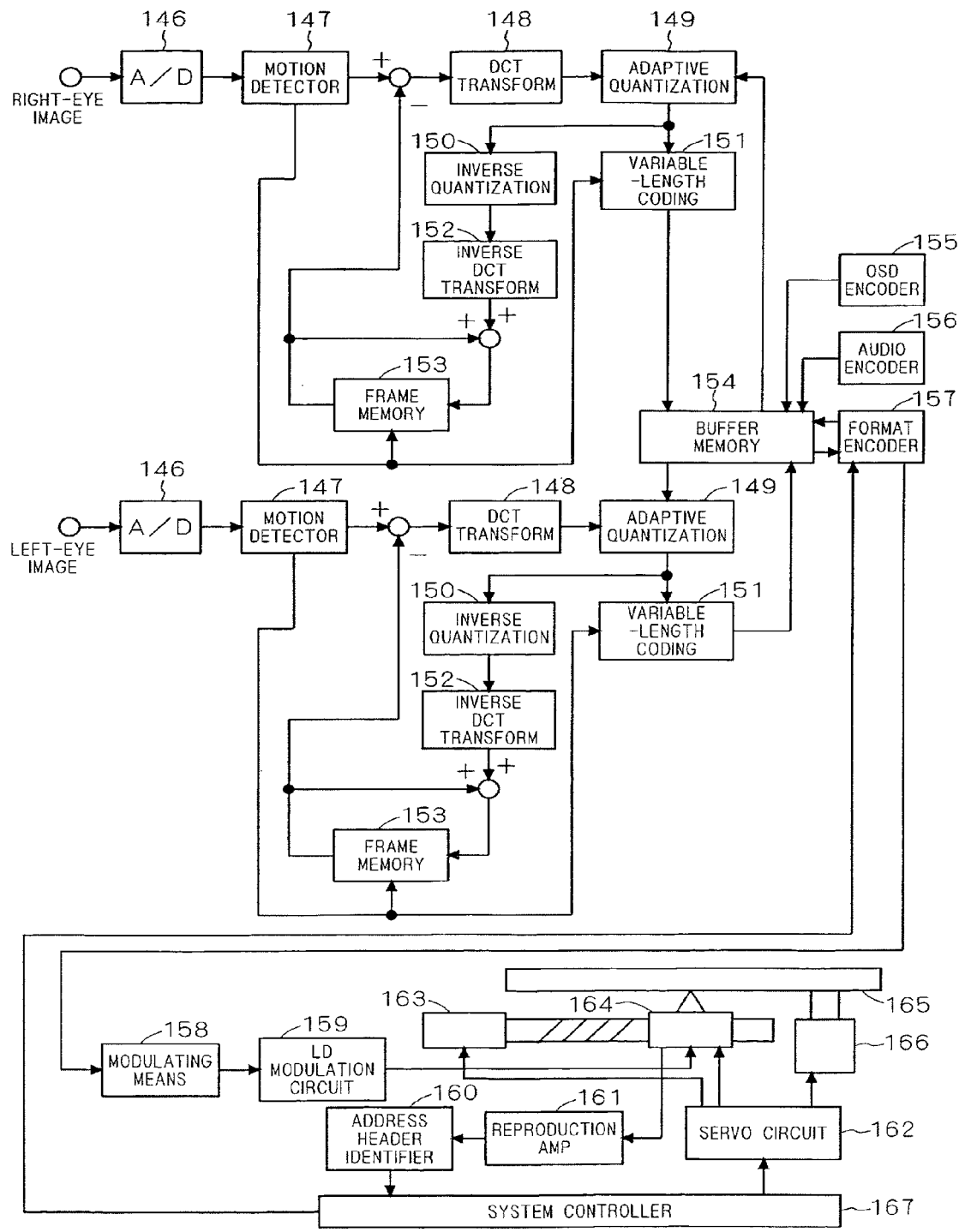
FIG. 24 is a block diagram of a stereoscopic video recording apparatus according to a third preferred embodiment of the present invention.

Next, a third preferred embodiment will be described. FIG. 24 is a block diagram of a stereoscopic video recording apparatus according to the third preferred embodiment. The stereoscopic video recording apparatus shown in FIG. 24 includes AD converters 146 for digitizing video signals respectively for the right-eye and left-eye images of stereoscopic video utilizing parallax information, motion vector detectors (motion detectors) 147 necessary for video compression in the temporal direction, DCT transform circuits 148 necessary for intra-compression, adaptive quantization circuits 149 necessary for intra-compression, and inverse quantization circuits 150 for local decoders. The stereoscopic video recording apparatus of FIG. 24 also includes variable-length coding circuits 151 necessary for intra-compression, inverse DCT transform circuits 152 for local decoders, frame memories 153 for local decoders, a buffer memory 154 for storing data after compressed, an OSD information encoder 155, an audio encoder 156, a format encoder 157, modulating means 158 for generating a signal to be written to an optical disk 165, and an LD modulation circuit 159. The stereoscopic video recording apparatus of FIG. 24 further includes an address header identification circuit 160 for extracting addresses for recording to the optical disk 165, a reproduction amp 161 for reproducing a signal from an optical head 164, a servo circuit 162 for controlling the optical head 164, feed motor 163 and rotary motor 166, and a system controller 167 for controlling and managing the sequence of the entire apparatus.

Figure 25:
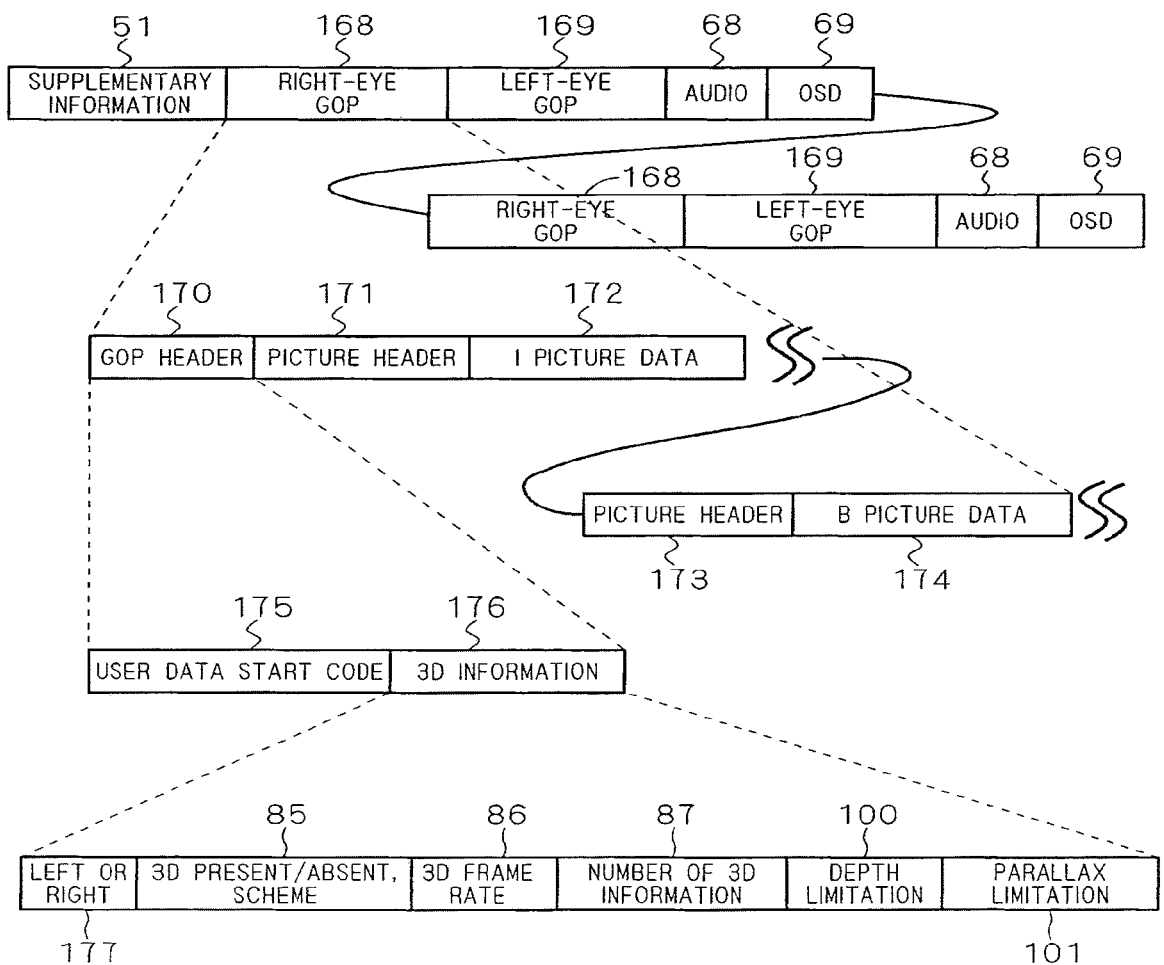
FIG. 25 is a diagram illustrating the structure of a video stream according to the third preferred embodiment of the present invention.

FIG. 25 is a diagram illustrating the stream structure of a stereoscopic video signal generated on the basis of the stereoscopic video recording apparatus of FIG. 24. The stream structure of the stereoscopic video signal of FIG. 25 includes supplementary information 51, which is followed by repetitions of a right-eye image GOP 168, left-eye image GOP 169, audio information 68, and OSD information 69. The right-eye GOP 168 of FIG. 25 includes a GOP header 170, picture headers 171 and 173, I picture data 172, and B picture data 174. Also, the GOP header 170 of FIG. 25 includes a user data start code 175 in the GOP header 170, and 3D video information 176 in the GOP header 170. Also, the 3D video information 176 of FIG. 25 includes information 177 indicating whether the pictures are for the left eye or the right eye, 3D video scheme and presence/absence information 85, 3D frame rate information 86, the number of 3D video information 87, depth limitation information 100, and parallax limitation information 101.

Figure 26:
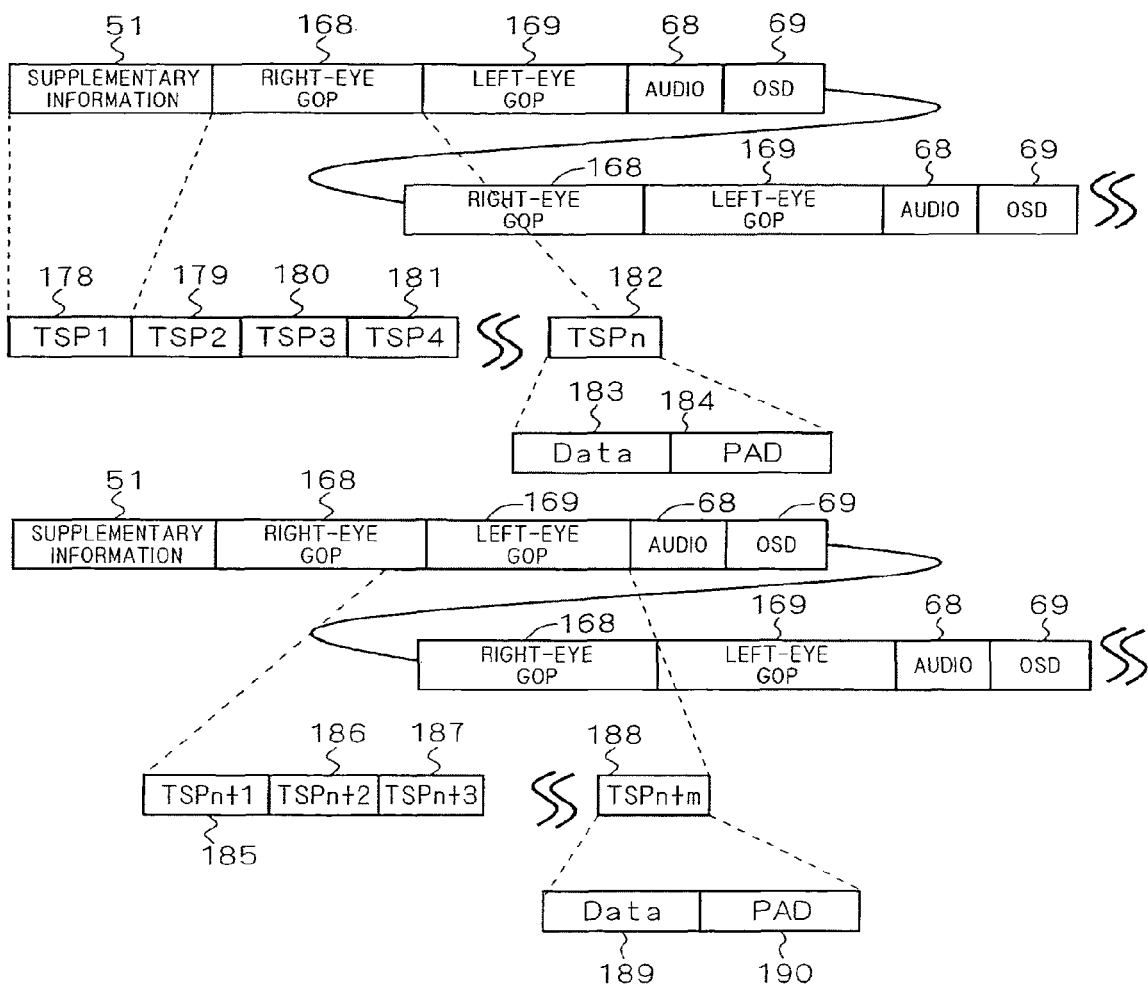
FIG. 26 is a diagram illustrating the structure of a video stream according to the third preferred embodiment of the present invention.

FIG. 26 illustrates a lower-order structure of the stereoscopic video signal stream generated on the basis of the stereoscopic video recording apparatus of FIG. 24. FIG. 26 shows the right-eye GOP 168 with transport stream packets 179 to 182, and the left-eye GOP 169 with transport stream packets 185 to 188. The data pieces 183 and 189 are the last data pieces respectively of the transport packets 182 and 188 where the last data pieces of the GOP video information are described, and padded portions 184 and 190 are attached respectively to the data 183 and 189.

Now, the stereoscopic video recording apparatus shown in FIG. 24 performs identical video compression for each of the left and right eyes, where the AD converter 146 digitizes right-eye pictures and the motion detector 147 extracts motion vectors on a macroblock-by-macroblock basis. Since the beginning of video data is intra-encoded, it is DCT-transformed in the DCT transform circuit 148, quantized in the adaptive quantization circuit 149, variable-length-coded in the variable-length coding circuit 151, and sent to the buffer memory. In this process, the video data after adaptive-quantized is processed in the local decoder formed of the inverse quantization circuit 150 and the inverse DCT transform circuit 152, and the original video signal is thus reconstructed and stored in the frame memory 153. Then, by making a comparison with motion-compensated pictures in the frame memory 153, the following pictures to be compressed in the temporal direction can be compressed by using differential information only. Such a compression scheme is a widely-used, basic scheme in compression methods like MPEG, H.264, etc.

In the configuration of FIG. 24, the right-eye images and left-eye images are inputted as independent video streams and encoded in separate encoder blocks. Accordingly, the configuration of FIG. 24 includes identical blocks arranged in parallel for the right eye and the left eye. However, the same processing can be achieved with a single encoder block, by providing a memory at the input to once store left-eye and right-eye images, and processing them in the same encoder block at a doubled rate. The stereoscopic video information thus encoded is sent to the buffer memory 154, and provided with OSD information from the OSD encoder 155, audio information from the audio encoder 156, and supplementary information necessary for the format from the format encoder 157, and thus formed into a data format for recording to the optical disk 165 as a recording medium. The format encoder 157 also provides the supplementary information necessary for the recording of 3D video information according to the present invention, as well as Navi information and menu information necessary for conventional optical disk formats.

The video data in the format for recording to the optical disk is sent to the modulating means 158, and optically modulated and provided with error correcting code as information for physical writing to the optical disk 165. Then the LD modulation circuit 159 generates a signal for modulating the laser provided in the optical head 164. In this process, the servo circuit 162, for ensuring stable recording to the optical disk 165, controls the feed motor 163 for moving the optical head 164, the rotary motor 166 for rotating the disk 165, and the objective lens actuator in the optical head 164, to achieve tracking and focusing. During recording, it is necessary to read addresses on the optical disk 165, and a signal received at the optical head is photo-electrically converted to a fine signal, and the reproduction amp 161 reproduces the fine signal, and the address header identification circuit 160 generates address information. The address information is sequence-processed in the system controller 167 together with settings for activation of individual blocks, and processings for writing timing etc., especially requiring high-speed timing, are performed in dedicated hardware, and sequence setting portions requiring programming are performed in the CPU etc.

Now, the video stream generated by the stereoscopic video recording apparatus has a structure as illustrated in FIG. 25. First, generally compressed video data that includes temporally compressed pictures, e.g. by MPEG, includes intra-compressed encoded pictures called GOP. For example, it is formed as a video block of about 15 pictures. Herein, there are two video blocks for the right eye and the left eye that utilize parallax information, and so the right-eye GOPs 168 and the left-eye GOPs 169 are sequentially arranged following the supplementary information 51 located at the beginning. In this example, one GOP is used for each of the right eye and the left eye, but a plurality of GOPs of the same number may be used in a range where video conditions are unchanged. Also, the supplementary information 51 is structured as described in the second preferred embodiment, and a user data start code is newly defined in the GOP header portion, and 3D video information 176 may be described following it.

The 3D video information 176 first includes information (or a flag) 177 indicating whether it is for the left eye or the right eye, and further includes 3D video scheme presence/absence 85, 3D video frame rate 86, number of 3D video information 87, depth information 100, and parallax limitation information 101, as described in the second preferred embodiment. Also, as shown in FIG. 26, for the supplementary information 51, a private packet (TSP1) 178 is provided at the transport packet layer, and it is separated and extracted in the transport decoder portion. Structuring the information as shown in FIG. 25 enables extraction of the same 3D information also at the MPEG data hierarchy level. When the reproducing apparatus and a TV are link-connected and 3D video settings are automatically made, or when the TV is switched in the course of reproduction, the supplementary infatuation 51 is valid when the supplementary information extraction setting is valid on the TV side, and the 3D video information 176 is valid when stereoscopic video supplementary information at the MPEG layer is valid.

FIG. 25 describes the video stream in units at the MPEG information layer, and FIG. 26 describes it in units of transport packets that are one layer below. In FIG. 26, the video data in a block unit of the right-eye and left-eye GOPs 168 and 169 starts at the head of the transport packet 179, and it does not always fit an integer multiple of a transport packet at the end of the GOP video information. Accordingly, the remaining part of the last transport packet 182 is padded, and the padded data 184 is attached to the last data 183 to fill in information. Thus, the right-eye GOP 168 alone can be extracted by extracting the part from the transport packet 179 to the transport packet 182. The left-eye GOP 169 is processed in the same way as the right-eye GOP, and the left-eye video alone can be extracted by extracting the part from the transport packet 185 to the transport packet 188 including the padded data 190.

Figure 27:
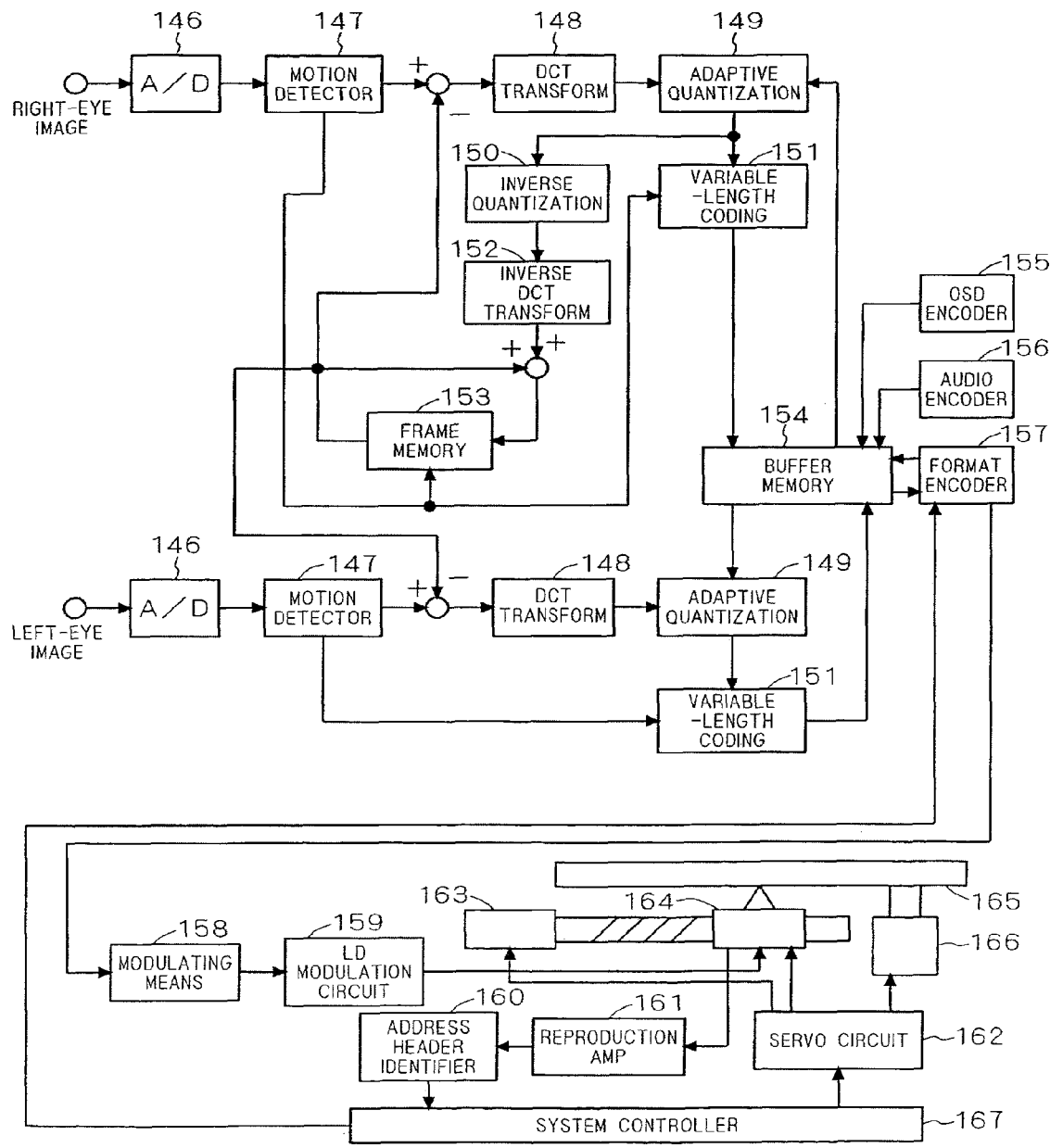
FIG. 27 is a block diagram of a stereoscopic video recording apparatus according to the third preferred embodiment of the present invention.

The stereoscopic video recording apparatus shown in FIG. 24 encodes the intact left-eye and right-eye images. However, basically, right-eye images and left-eye images are visual information shifted by parallax, and therefore they are very closely correlated. Therefore, the amount of entire information can be compressed by using a configuration that records only the differential information about the left-eye images in relation to the right-eye images, for example. FIG. 27 is a block diagram of a stereoscopic video recording apparatus configured for this purpose. In the stereoscopic video recording apparatus of FIG. 27, the right-eye video block is structured for primary images, and it adopts the same configuration as the video compression blocks shown in FIG. 24. However, for the left-eye images, a differential is taken between the output of the motion detector 147 for the left eye and the output of the frame memory 153 for the right eye, so as to solely extract the differential information between the right-eye and left-eye images. The differential information is processed in the DCT transform 148 and the adaptive quantizer 149 in the left-eye image line, and further processed in the variable-length coder 151, and then the differential information for the left eye is recorded in the buffer memory 154. The following procedures, to the writing to the optical disk, are performed in the same way as shown in FIG. 24. The example of FIG. 27 uses right-eye images as primary images and left-eye images as secondary images as differential, but the right-eye images and the left-eye images can of course be used in the opposite manner (left-eye images can be used as primary images and right-eye images can be used as secondary images as differential).

Figure 28A:
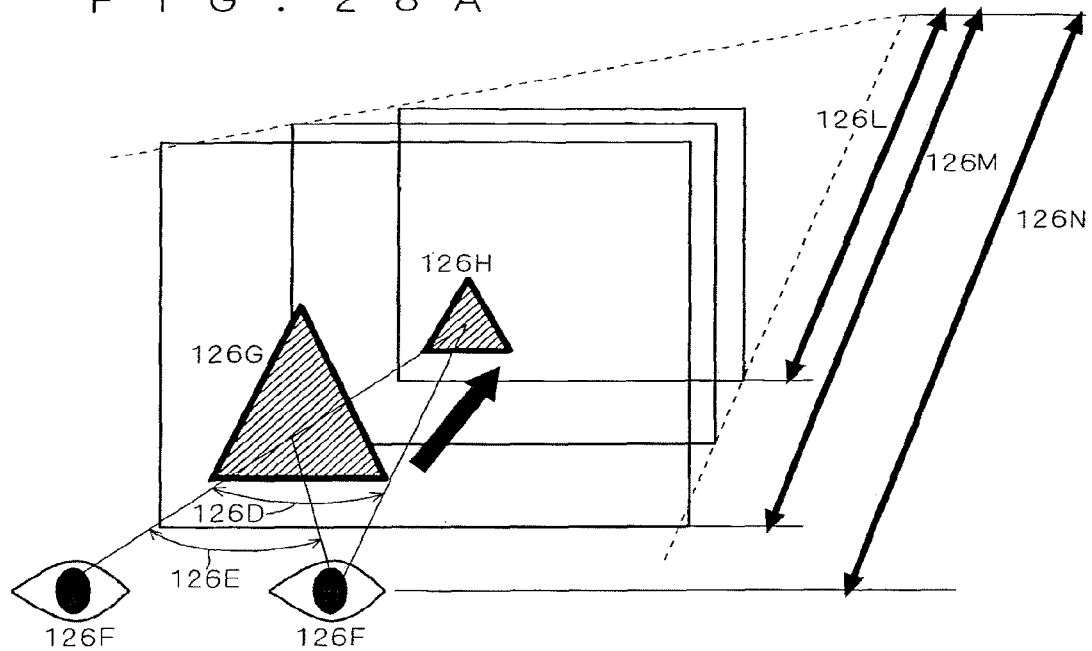
FIGS. 28A and 28B are conceptual diagrams of parallactic images used to illustrate the principles of compression with differential information according to the third preferred embodiment of the present invention.
Figure 28B:
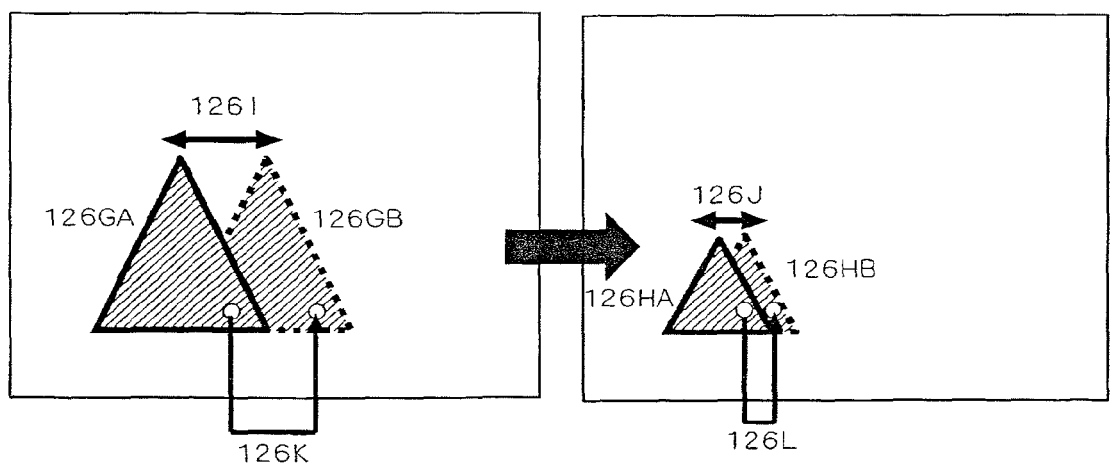

The stereoscopic video recording apparatus of FIG. 27 takes a differential between the left-eye and right-eye images to further compress the amount of video information on one side, but the information can be further compressed since the video information is based on parallax information. FIGS. 28A and 28B are schematic diagrams illustrating the principles of parallactic images. FIG. 28A shows an object 126G on the front side at a depth position 126M, an object 126H on the depth side at a depth position 126L, a depth position (most forward) 126N to the eyes 126F, a viewing angle 126D for the object 126H, and a viewing angle 126E for the object 126G. FIG. 28B shows a left-eye image 126GA of the object 126G, a right-eye image 126GB of the object 126G, a parallax 126I between the left-eye image 126GA and the right-eye image 126GB, and same pixel points 126K in the left-eye and right-eye images. Also, FIG. 28B shows a left-eye image 126HA of the object 126H, a right-eye image 126HB of the object 126H, a parallax 126J between the left-eye image 126HA and the right-eye image 126HB, and same pixel points 126L in the left-eye and right-eye images.

Figure 29:
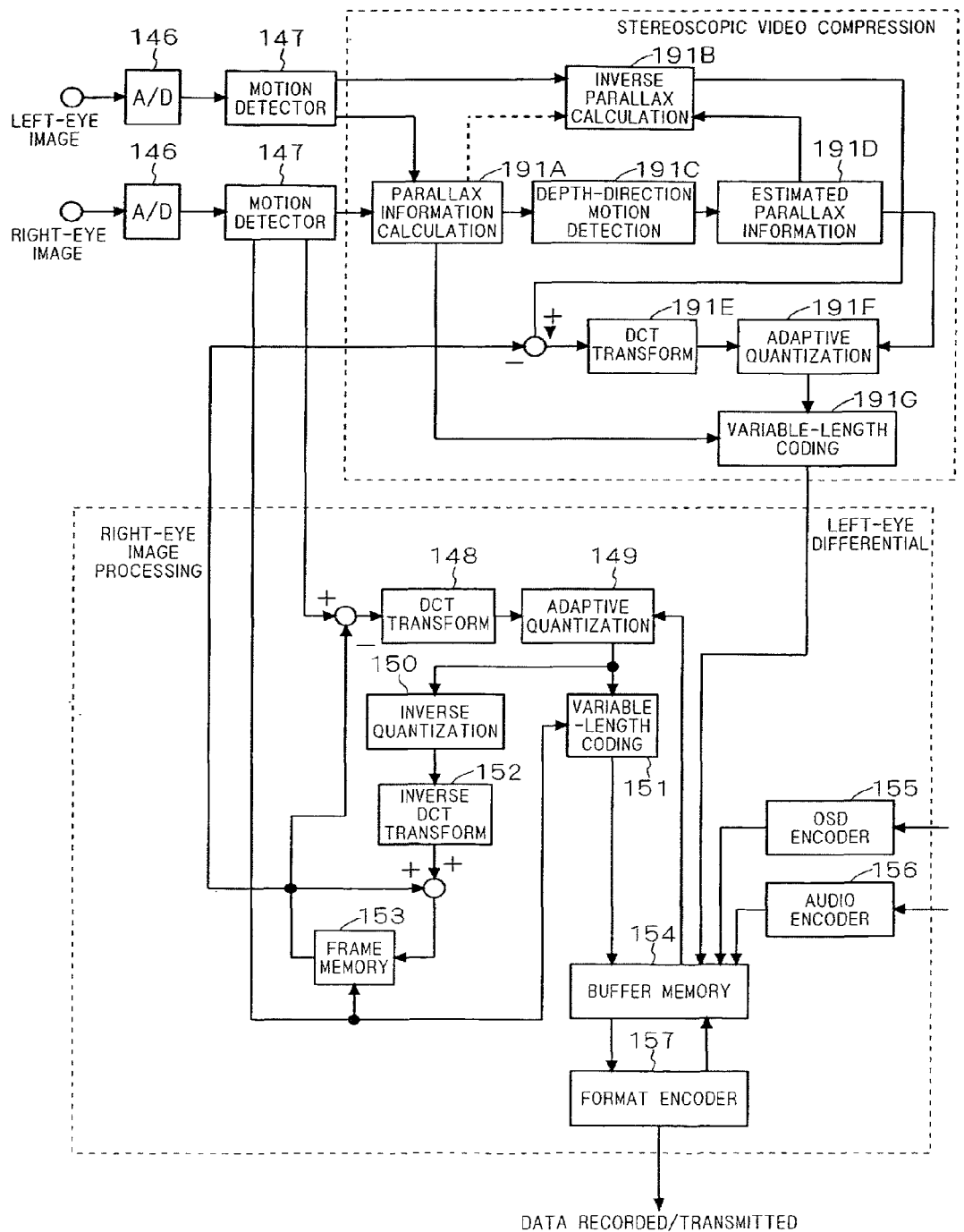
FIG. 29 is a block diagram of a stereoscopic video recording apparatus according to the third preferred embodiment of the present invention.

FIG. 29 is a block diagram of a stereoscopic video recording apparatus for further compressing images on one side. The stereoscopic video recording apparatus shown in FIG. 29 includes a parallax information calculating circuit 191A for calculating the amount of parallax between right-eye and left-eye images, a depth-direction motion detecting circuit 191C, and an estimated parallax information generating circuit 191D. Also, the stereoscopic video recording apparatus of FIG. 29 includes an inverse parallax calculating circuit 191B for converting original left-eye images to right-eye images on the basis of the estimated parallax information, a DCT transform circuit 191E for performing DCT transform on the basis of the result of a comparison of a right-eye image with the right-eye image generated by the inverse parallax calculating circuit 191B, an adaptive quantization circuit 191F, and a variable-length coder 191G. The portion from the parallax information calculating circuit 191A to the variable-length coder 191G forms a block that performs stereoscopic video compression processing.

Figure 30:
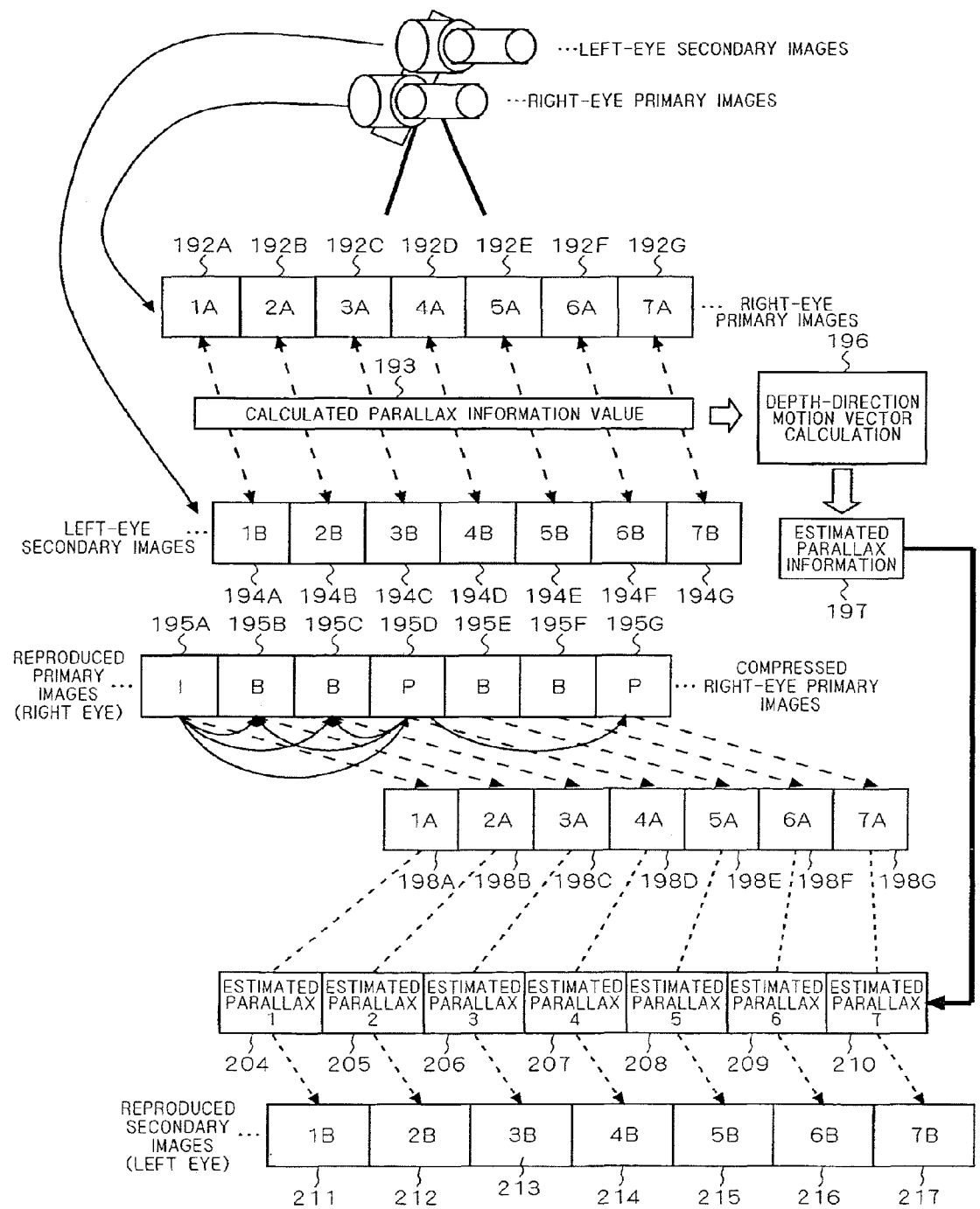
FIG. 30 is a schematic diagram illustrating a compression by image conversion with parallax information according to the third preferred embodiment of the present invention.
Figure 31:
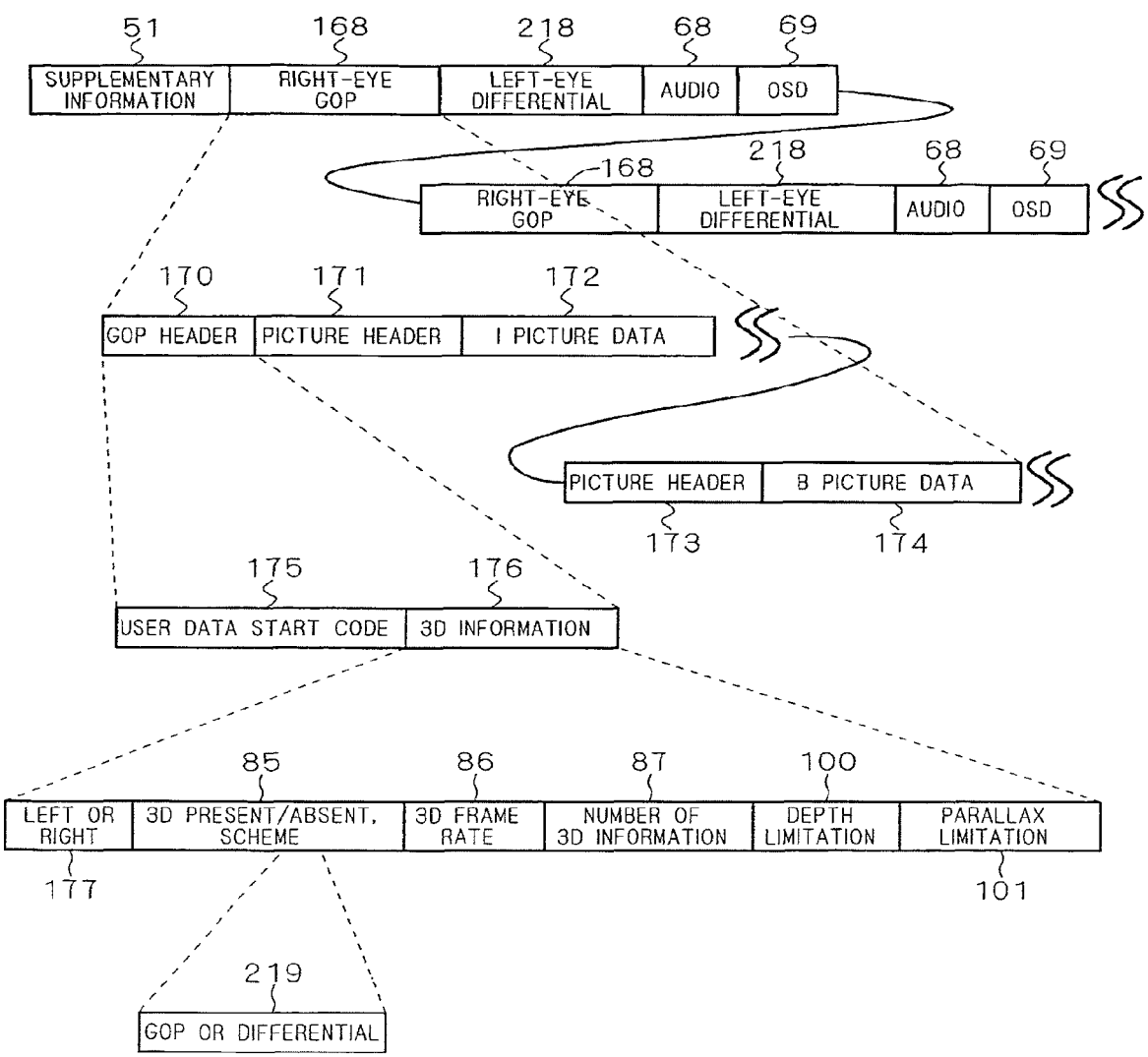
FIG. 31 is a diagram illustrating the structure of a video stream according to the third preferred embodiment of the present invention.
Figure 32:
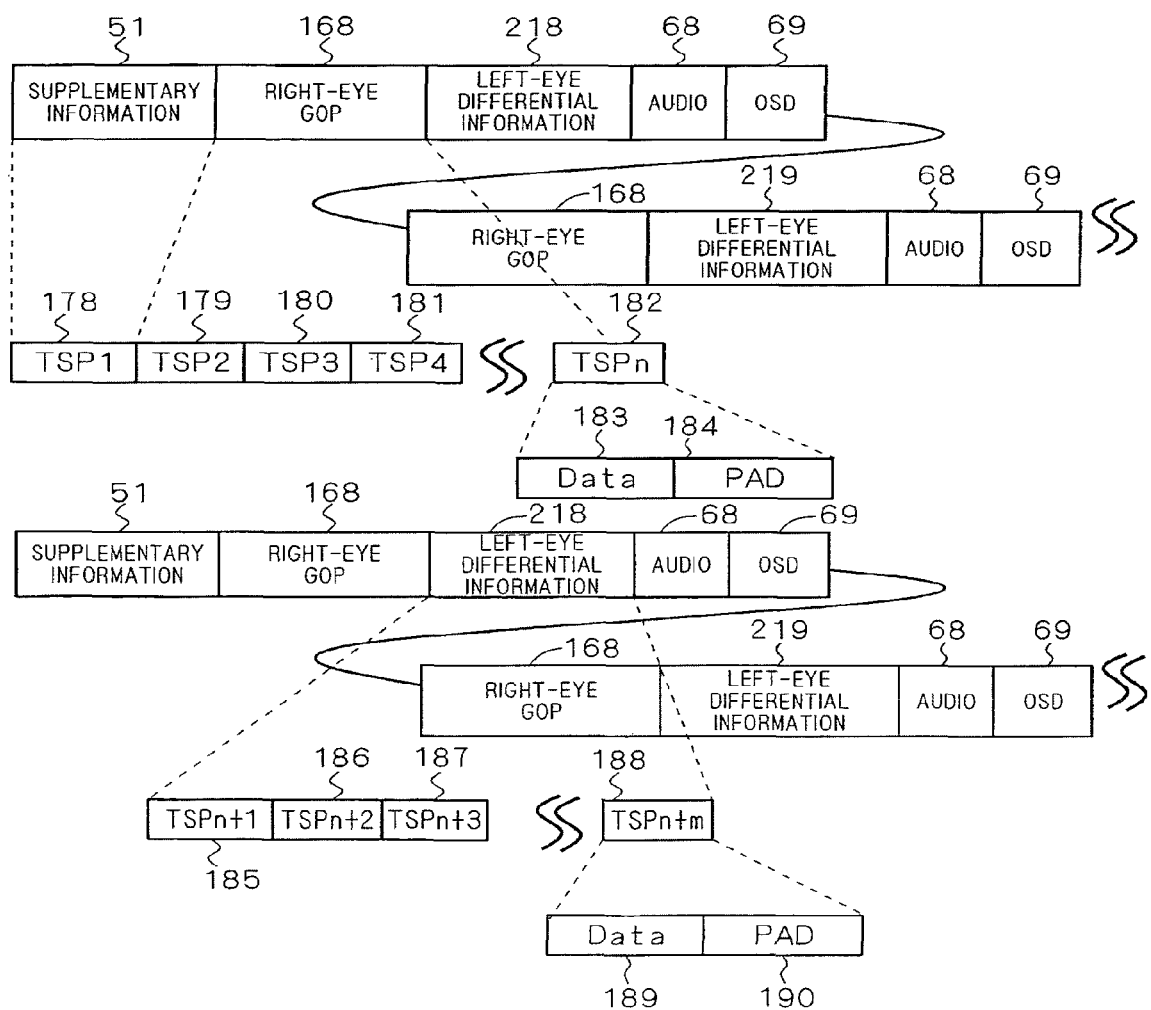
FIG. 32 is a diagram illustrating the structure of a video stream according to the third preferred embodiment of the present invention.

FIG. 30 is a diagram illustrating the encoding and decoding of a video stream by the compression method of the stereoscopic video recording apparatus of FIG. 29. FIG. 30 shows right-eye images 192A to 192G, parallax information calculated value 193 about the left-eye and right-eye images, left-eye images 194A to 194G, depth-direction motion vector calculated value 196, estimated parallax information 197, and compressed right-eye primary images 195A to 195G. FIG. 30 also shows reproduced primary images 198A to 198G based on the compressed right-eye primary images 195A to 195G, estimated parallax information 204 to 210 respectively corresponding to the reproduced primary images 198A to 198G, and reproduced secondary images 211 to 217. FIG. 31 is a diagram illustrating the structure of a video stream generated by the compression method of the stereoscopic video recording apparatus shown in FIG. 27 or FIG. 29. The video stream structure shown in FIG. 31 is basically the same as that of FIG. 25, but it includes differential video information 218 in place of the left-eye GOPs 169, and additionally includes information 219 in the 3D video scheme presence/absence 85 to indicate whether the information is GOP video information or differential information. FIG. 32 illustrates the stream structure at the transport level of the video stream generated by the compression method of the stereoscopic video recording apparatus of FIG. 29. FIG. 32 is basically the same as FIG. 26, but it includes differential video information 218 in place of the left-eye GOPs 169.

Now, FIG. 28A illustrates the stereoscopic direction with right-eye and left-eye images utilizing parallax. In FIG. 28A, the parallactic angle seen from the eyes 126F appears different depending on the depth. Accordingly, in the right and left parallactic images shown in FIG. 28B, the object 126G on the near side is seen as being larger, and the left-eye image 126GA and the right-eye image 126GB are seen as being separated away, and the amount of parallax 126I is larger. On the other hand, the object 126H at a distance is seen as being smaller, and the left-eye image 126HA and the right-eye image 126HB are seen as being closer, and the amount of parallax 126J is smaller.

Accordingly, with information about the amount of parallax (126I or 126J) or with information about the parallactic angle (126D or 126E), it is possible, as shown in FIG. 28B, to estimate the right-eye image from the left-eye image (126K and 126L: image generation by conversion with parallax information). This estimation assumes that the brightness and color do not change depending on the angle of view, and therefore variations caused by turning-around of images, shades, etc. remain unpredictable by this estimation.

Now, in the stereoscopic video recording apparatus shown in FIG. 29, the parallactic angle is extracted on the basis of in-plane position information about objects that is obtained from the left-eye and right-eye motion detectors 147, and the parallax information calculating circuit 191A calculates parallax information on a macroblock-by-macroblock basis or a pixel-by-pixel basis. Also, for the compression in the temporal direction, the depth-direction motion detecting circuit 191C extracts motion vectors in the depth direction between pictures. The estimated parallax information generating circuit 191D generates estimated parallax information with the depth-direction motion information and the parallax information. Also, as mentioned above, when there is only the parallax information from an image on one side (described herein as a right-eye image), it is not possible to perfectly recover the image on the opposite side (described herein as a left-eye image), and therefore there remains unpredictable information, like variations caused by turning-around of images (e.g., a hidden portion becomes viewable).

Accordingly, in the stereoscopic video compression by the stereoscopic video recording apparatus shown in FIG. 29, the inverse parallax calculating circuit 191B first performs a local-decode reproduction of an image on the opposite side (described herein as the left-eye image), though not perfectly, by utilizing the estimated parallax information, and then a differential is obtained between it and the actually filmed image that has been compressed (the image in the frame memory 153 of the local decoder). The differential information is about the un-reproducible portion caused by variations due to turning-around of images as mentioned above, and it is possible to cover the portion that cannot be perfectly reproduced with the parallax information, in the compressed stream that utilizes parallax information. Also, though not shown, when depth-direction motion vectors are extracted, the amount of variation of parallax is also utilized as information. Thus, the depth-direction motion vectors can be utilized to increase the compression efficiency, by using an inverse quantization circuit, an inverse DCT transform circuit, and a frame memory, like an ordinary local decoder for information compression.

Now, FIG. 30 shows the image data in units of pictures. In FIG. 30, the right-eye primary images 192A to 192G are extracted from the right-eye camera, and the left-eye secondary images 194A to 194G are extracted from the left-eye camera. Then, the parallax information calculating circuit 191A of FIG. 29 calculates the parallax information 193 from the right-eye primary images 192A to 192G and the left-eye secondary images 194A to 194G. The depth-direction motion vector calculation 191C extracts the depth-direction motion-vector calculated value 196 from variations of the parallax information 193 between pictures, and the estimated parallax information 197 is generated. The estimated parallax information 197 itself may be on a macroblock-by-macroblock basis or a pixel-by-pixel basis.

On the other hand, in the reproduction of the images, the right-eye primary images 192A to 192G are in the form of the compressed right-eye primary images 195A to 195G that are encoded by the video compression. Specifically, the compressed right-eye primary images include an intra-compressed I picture 195A, P pictures 195D and 195G compressed in the temporal direction with in-plane motion vectors, and B pictures 195B, 195C, 195E, and 195F. The compressed right-eye primary images are reproduced into the reproduced right-eye primary images 198A to 198G by a common compressed-video-decompressing circuit. Then, the reproduced secondary images (left-eye images) 211 to 217 are restored on the basis of: the reproduced primary images (right-eye images) 198A to 198G; the estimated parallax information 204 to 210 about individual pictures; and differential information about individual pictures that are inverse-quantized and inverse-DCT-transformed. The image portions restored from the differential information work to complement the portions that cannot be reproduced with the estimated parallax information, caused by turning-around of images and the like.

FIG. 31 illustrates the video stream using the video compression by the stereoscopic video recording apparatus of FIG. 29 or FIG. 27, and it is necessarily provided as data in GOP video information units. This is because the right-eye images are originally in units of GOP video information, and it is necessary to match the unit level of the images since the differentially-compressed data for the left eye utilizes the right-eye images. Now, the GOP header 170 in the right-eye GOP 168 includes supplementary information related to the stereoscopic video, like those described with FIG. 25. However, as shown in FIG. 31, for the left-eye images, it is necessary to describe the information 219 in the 3D video scheme presence/absence 85 to indicate whether it is GOP video information or differential information, so as to indicate whether it is compressed information that utilizes the estimated parallax information 197 shown in FIG. 29, or differentially-compressed information as shown in FIG. 27, or information that is not compressed as stereoscopic images as shown in FIG. 24. FIG. 32 illustrates the stream structure at the transport packet level, where the end of the GOP video data is padded in a transport packet in a manner as shown in FIG. 26, and the end of the stereoscopically compressed video data, too, is padded in a transport packet. The description above assumes the right-eye images as primary images and the left-eye images as secondary images that are compressed in the stereoscopic direction, but there is no problem at all when the images are processed in the opposite relation. Also, the video stream may include a mixture of right-eye images as primary images and left-eye images as secondary images, and left-eye images as primary images and right-eye images as secondary images. When such mixture is permitted by standards, it is necessary to describe identification information indicating which constitutes primary images and which constitutes secondary images.

Figure 34:
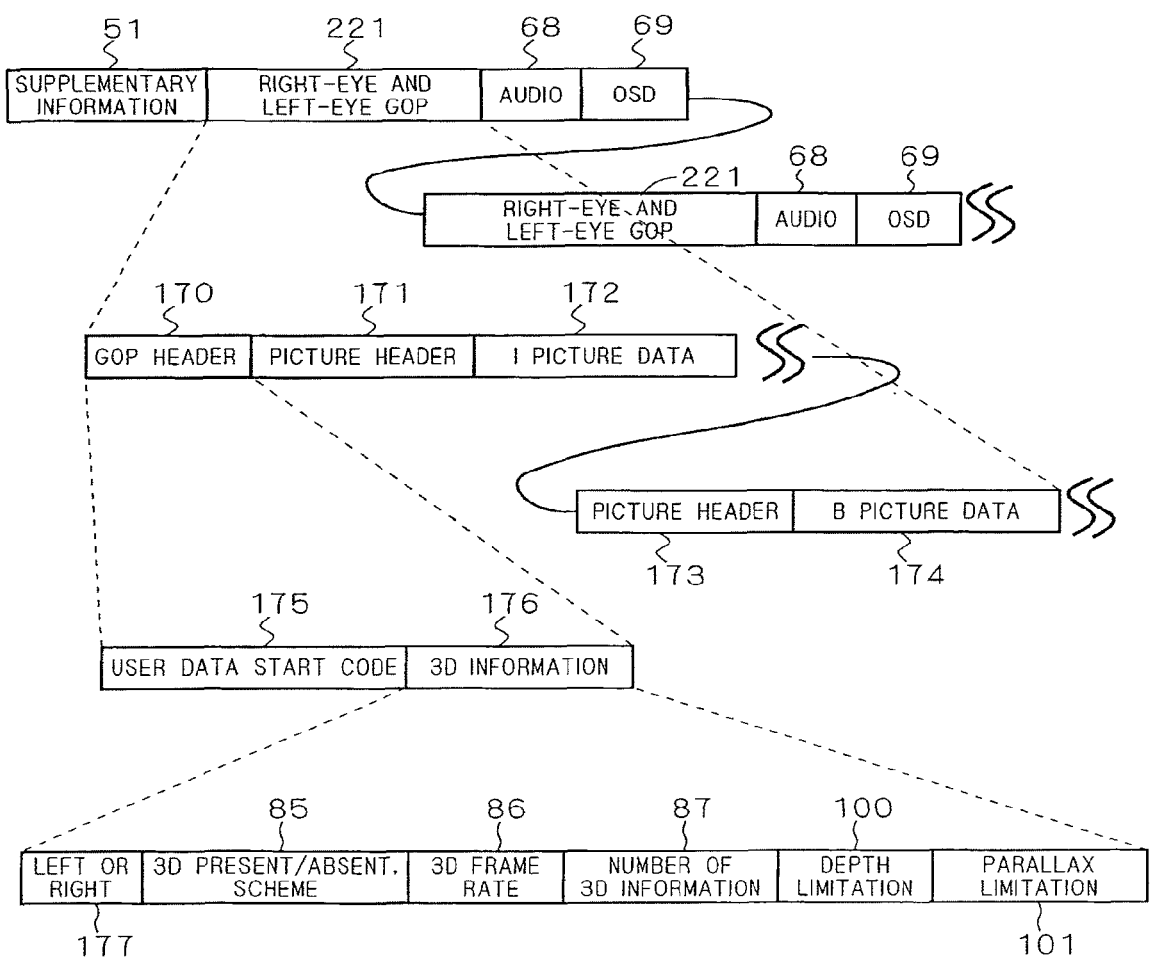
FIG. 34 is a diagram illustrating the structure of a video stream according to the third preferred embodiment of the present invention.
Figure 35:
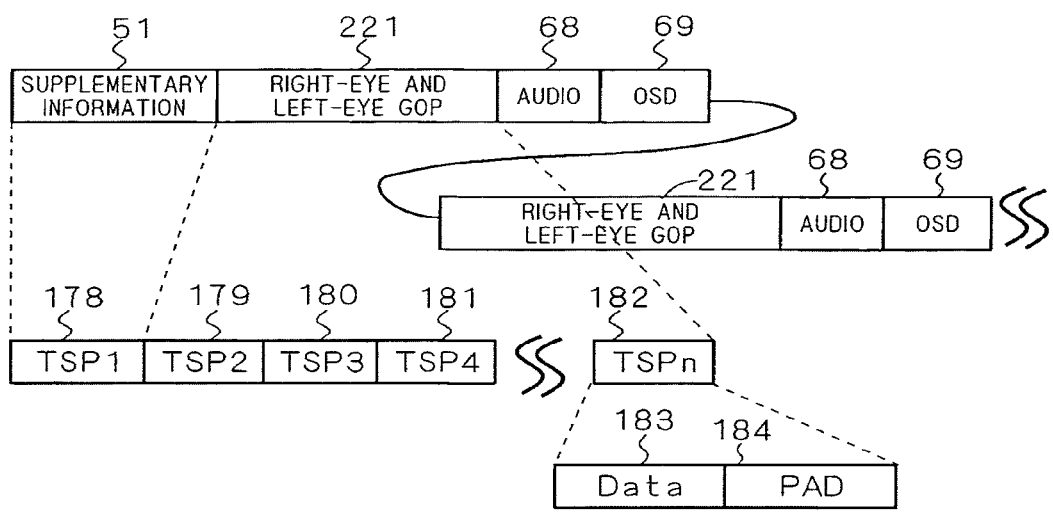
FIG. 35 is a diagram illustrating the structure of a video stream according to the third preferred embodiment of the present invention.

It is also possible to more simply construct a video stream with stereoscopic images for the left eye and the right eye. For example, the stereoscopic video recording apparatus shown in FIG. 33 includes a synthesizing circuit 220 as a video constructing block for simply constructing a video stream. FIG. 34 illustrates the structure of a video stream by the stereoscopic video recording apparatus shown in FIG. 33, where a left-eye and right-eye GOP 221 forms a single GOP video information unit. FIG. 35 illustrates the structure at the transport packet level of the video stream by the stereoscopic video recording apparatus shown in FIG. 33.

Figure 33:
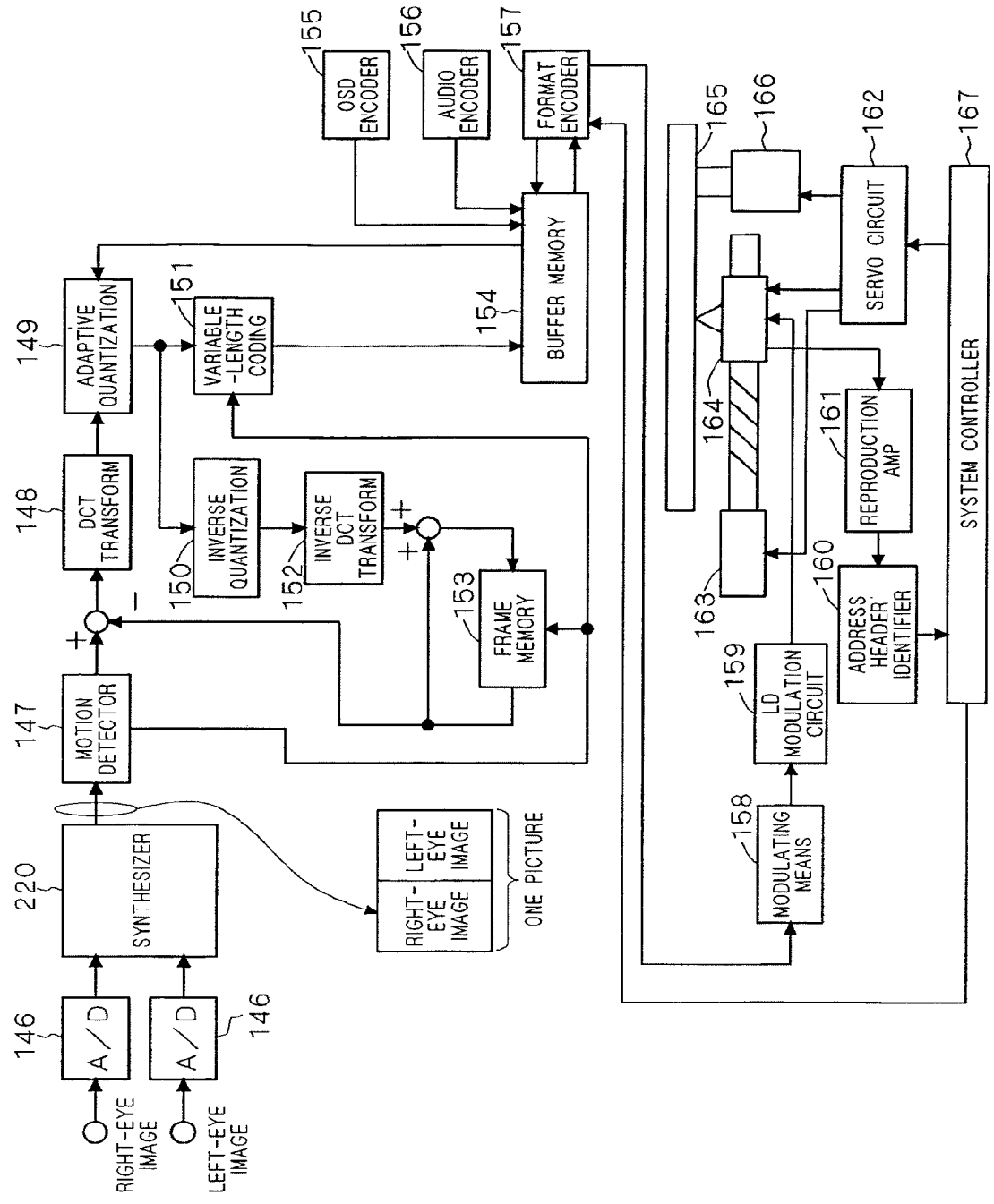
FIG. 33 is a block diagram of a stereoscopic video recording apparatus according to the third preferred embodiment of the present invention.

Now, as shown in FIG. 33, the inputted parallactic images for the left eye and the right eye are once inputted to the synthesizing circuit 220, and inserted into one picture as two vertically-elongate images. In this process, the pixels of the images are not simply thinned in image lines, but are filtered and compressed in the horizontal direction, and then synthesized into a left-eye and right-eye picture. Thus, each picture is composed of two vertically-elongate images for the left eye and the right eye, and then formed into a stream by a common video compression scheme. In this case, too, in the video stream shown in FIG. 34, it is necessary that the supplementary information 51 or the 3D information region 176 in the GOP header 170 describe that the video information is compressed in the horizontal direction, so that it is not intactly reproduced in an ordinary TV. In the case of the video stream structure shown in FIG. 34, as in those shown in FIGS. 26 and 32, the padded data 184 for filling in information is attached to the last data 183 of the transport packet at the end of the GOP video information at the transport packet level. The invention has described stereoscopic video recording apparatuses and stereoscopic video recording methods for recording on an optical disk, but it is needless to say that entirely the same effects are obtained when a hard disk is used as a recording medium.

Fourth Preferred Embodiment

Next, a fourth preferred embodiment will be described referring the drawings. This preferred embodiment describes stereoscopic video reproducing apparatuses, while the third preferred embodiment has described stereoscopic video recording apparatuses. FIG. 36 is a block diagram of a stereoscopic video reproducing apparatus according to this preferred embodiment. The stereoscopic video reproducing apparatus of FIG. 36 includes a demodulation and correction circuit 222, an address header identification circuit 223, an IF (interface) 224 for connecting the optical disk drive block and the back-end as a video audio processing block, and a data buffer 225 for once storing data from the optical disk drive block. The stereoscopic video reproducing apparatus of FIG. 36 also includes a system decoder 226 for separating streams of video data, audio data, etc., an MPEG H264 decoder 227 for decompressing compressed images, an audio decoder 228, an OSD decoder 229 for display of subtitles etc., and an OSD information depth generating circuit 229A. The stereoscopic video reproducing apparatus of FIG. 36 further includes a 3D video processing circuit 230, a blending circuit 229B for superimposing the OSD information on images, a general-purpose IF 231 for external connection, a dedicated right-eye IF 232, a dedicated left-eye IF 233, a buffer circuit 234, and a system controller 235 for the entire back-end.

Figure 37:
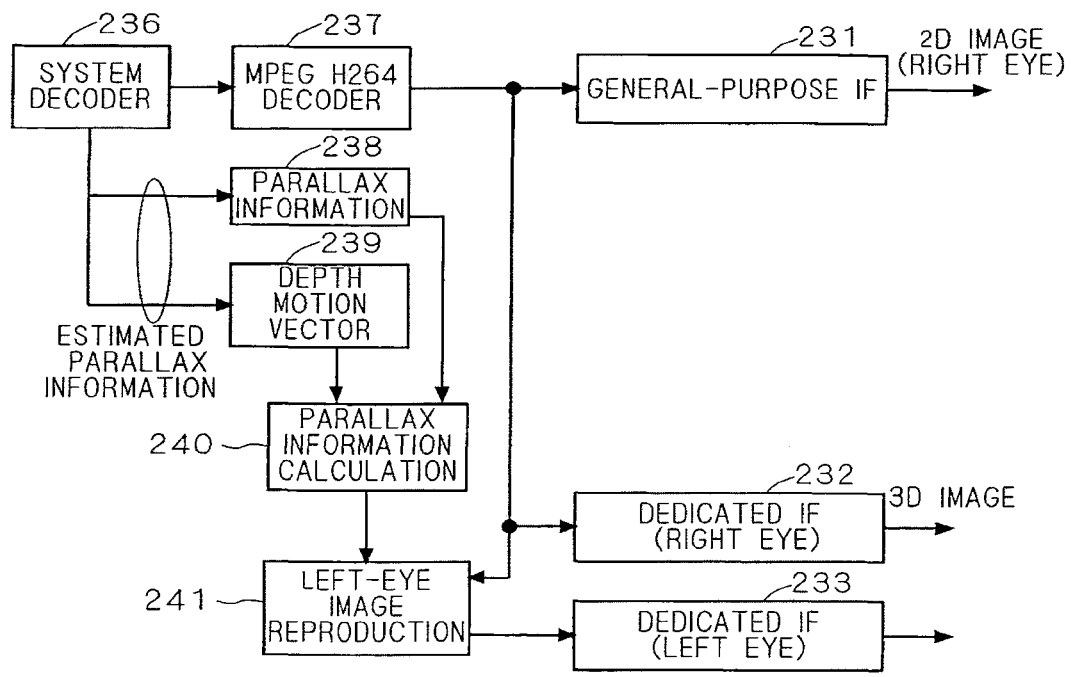
FIG. 37 is a block diagram of a stereoscopic video reproducing apparatus according to the fourth preferred embodiment of the present invention.

FIG. 37 is a block diagram illustrating a block for decoding left-eye images from stereoscopically compressed images, as described in the third preferred embodiment. The apparatus shown in FIG. 37 includes a system decoder 236 for extracting parallax information and depth motion vector information from the video stream, an MPEG H264 decoder 237 for decoding a video stream compressed by MPEG, H 264 or the like, parallax information 238, motion vector information 239, a parallax information calculating circuit 240, and a left-eye image reproducing circuit 241. The parallax information 238, motion vector information 239, parallax information calculating circuit 240, and left-eye image reproducing circuit 241 form a 3D video processing circuit 230.

Now, in the stereoscopic video reproducing apparatus shown in FIG. 36, first, the demodulation and correction circuit 222 in the optical disk drive reproduces video audio data and supplementary data that are described on an optical disk 165. In this process, a servo circuit 162 operates such that the reproduction signal from the optical head 164 is continuously extracted with high quality, and the address header identification circuit 223 operates such that access can be instantaneously made to certain addresses. The data reproduced by the optical disk drive is once inputted to the data buffer circuit 225 through the IF circuit 224, and then inputted to the system decoder 226. The system decoder 226 separates the stream into video, audio, etc., and the audio information is inputted to the audio decoder 228, the OSD information is inputted to the OSD decoder 229, and the video information is inputted to the MPEG H264 decoder 227.

In the OSD depth generating circuit 229A, OSD information is generated as OSD information having depth, on the basis of supplementary information obtained from the system decoder 226. The video stream decoded in the MPEG H264 decoder 227 is processed as 3D video information in the 3D video processing circuit 230, and blended in the blending circuit 229B with the OSD images having depth, and it can be outputted from the general-purpose IF, such as HDMI, when the transfer rate is low, or the left-eye images can be outputted from the dedicated left-eye IF 233 and the right-eye images from the dedicated right-eye IF 232.

When images on one side are further compressed by using parallax information, as described in the third preferred embodiment, the 3D video processing 230 of the stereoscopic video reproducing apparatus is configured as shown in FIG. 37. In FIG. 37, on the basis of the depth motion vector 239 and the parallax information 238 as compressed left-eye image information extracted by the system decoder 236, the parallax information calculating circuit 240 performs a parallax information calculation on a pixel-by-pixel basis or a macroblock-by-macroblock basis, so as to generate conversion coefficients for generating left-eye images from right-eye images. By using the conversion coefficients, the left-eye image reproducing circuit 241 reproduces left-eye images on the basis of the right-eye images generated by the MPEG 14264 decoder. When the compressed left-eye images are compressed only with parallax information, the processing only involves re-conversion based on the output of the parallax information calculating circuit 240. On the other hand, in the case of compressed information subjected to DCT transform and adaptive quantization in a manner as described with the stereoscopic video recording apparatus of FIG. 33, it is necessary to provide inverse quantization and inverse transform circuits in the left-eye image reproducing circuit 241.

Figure 38A:
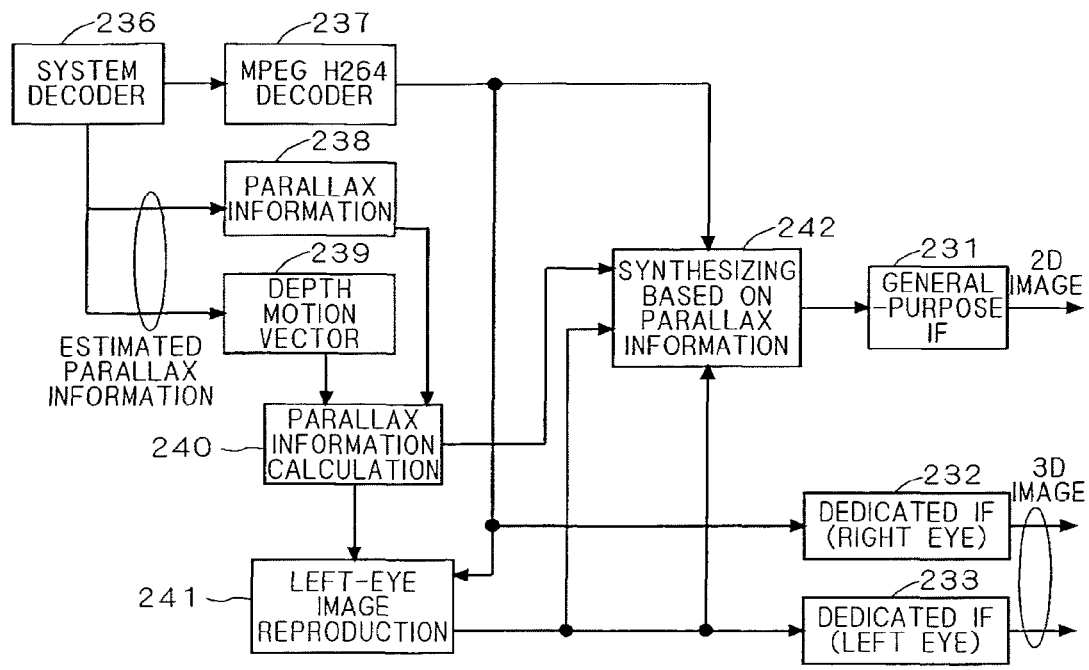
FIGS. 38A and 38B are diagrams illustrating a stereoscopic video reproducing apparatus according to the fourth preferred embodiment of the present invention.
Figure 38B:
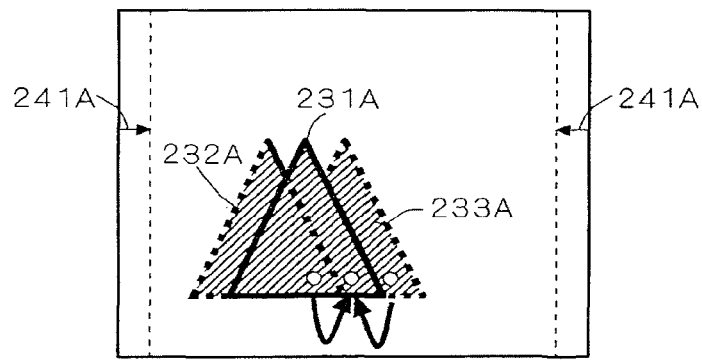

Next, a stereoscopic reproducing apparatus will be described which reproduces 2D images, not stereoscopic, from left-eye and right-eye stereoscopic images. FIG. 38A is a block diagram of the stereoscopic reproducing apparatus for reproducing 2D images. The apparatus of FIG. 38A includes a synthesizing circuit 242 based on parallax information. FIG. 38B is a diagram schematically illustrating an image constructed by the synthesizing circuit 242, where a left-eye image 232A and a right-eye image 233A are synthesized into a 2D image 231A. Now, common display apparatuses, such as TVs, are not always 3D-compatible, or they are more often 2D-compatible. Accordingly, it is desired that a medium that records only 3D images can be reproduced also two-dimensionally. The simplest method for this purpose is to reproduce 2D images by displaying right-eye images or left-eye images only. For example, when a TV is ready only for 2D, it is automatically detected in the link connection processing between the player and the TV, and the images on one side are continuously reproduced.

However, this method is problematic because an image having a depth close to the eyes (an image that appears protruding) involves a large amount of parallax, and then the position is shifted to the left or right as shown by the left-eye image 232A or the right-eye image 233A shown in FIG. 38B. Accordingly, it is possible to reproduce a natural 2D image by synthesizing left-eye and right-eye images by using parallax information and reproducing an image in the middle position as shown by the 2D image 231A. However, the areas near both ends of the screen cannot be calculated when the parallax is large, and the areas 241A of the image (both ends of the screen) will be "cut", unless the original image is filmed such that the left-eye image is wide to the left and the right-eye image is wide to the right.

Figure 39A:
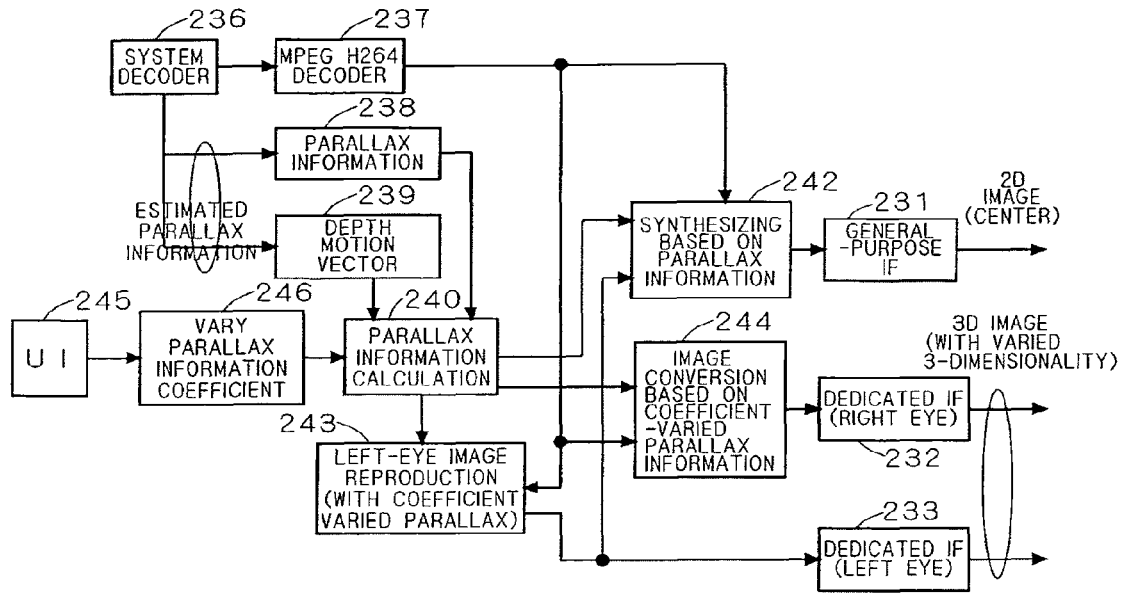
FIGS. 39A to 39D are diagrams illustrating a stereoscopic video reproducing apparatus according to the fourth preferred embodiment.
Figure 39B:
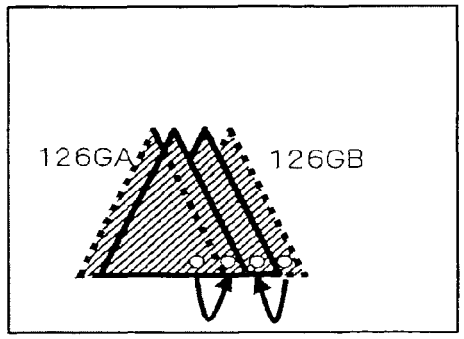
Figure 39C:
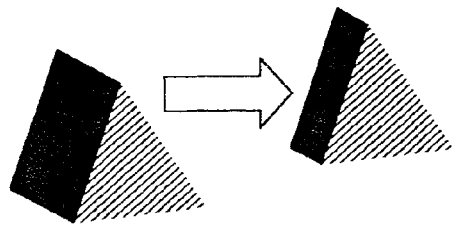
Figure 39D:
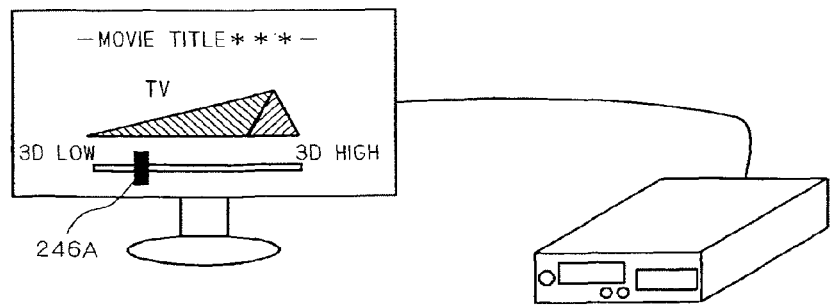

Furthermore, a large amount of protrusion (a high degree of three-dimensionality) might cause increased eye fatigue or an increased "surprising" impression as described in the second preferred embodiment. To prevent this, FIG. 39A shows a block diagram of a stereoscopic video reproducing apparatus that is capable of varying the amount of protrusion. The apparatus of FIG. 39A includes a left-eye image reproducing circuit 243 using coefficient-varied parallax, a right-eye image converting circuit 244 using coefficient-varied parallax, a user interface 245 for the varying of the amount of protrusion, and a parallax information coefficient varying portion 246. FIG. 39B is a diagram illustrating the variation of the amount of protrusion by the stereoscopic video reproducing apparatus. Also, FIG. 39C is a diagram illustrating the effect obtained by varying the amount of protrusion by the circuits of FIG. 39A. FIG. 39D illustrates an OSD bar 246A for varying the amount of protrusion, which is displayed on a display apparatus connected to the stereoscopic video reproducing apparatus.

In a scheme in which images on one side are compressed with parallax information, as described with the stereoscopic video recording apparatus of FIG. 29, parallax information that is directly related to the amount of protrusion is linked on a pixel-by-pixel basis or a macroblock-by-macroblock basis. Accordingly, when an instruction for varying the amount of protrusion is given from the user, the instruction is inputted to the user interface 245 by using the OSD display of the OSD bar 246A on the TV screen as shown in FIG. 39D, for example. Then, the parallax information coefficient varying portion 246 determines a conversion coefficient to determine to what degree the amount of protrusion should be attenuated. This conversion coefficient determines the amount of the parallax calculation in the parallax information calculating circuit 240. Then, the left-eye images are reproduced by the left-eye image reproducing circuit 243 on the basis of the coefficient-varied parallax, and the right-eye images are converted by the image converting circuit 244 on the basis of the coefficient-varied parallax information, whereby the amount of parallax between the left-eye images and right-eye images is converted to be smaller in such a manner that, as shown in FIG. 39B, the left-eye image 126GA and the right-eye image 126GB are converted from the broken lines to the solid lines. As a result, the stereoscopic images obtained from the outputs of the dedicated IFs 232 and 233 are reproduced with a reduced amount of protrusion as shown by the stereoscopic triangular object of FIG. 39C.

The stereoscopic video reproducing apparatus of FIG. 39A converts the amount of protrusion by using parallax information, when the parallax information is recorded on the video stream. However, parallax information may be absent. Accordingly, the stereoscopic video reproducing apparatus shown in FIG. 40 is configured so that the amount of protrusion can be controlled even when parallax information is not recorded in the video stream. The stereoscopic video reproducing apparatus of FIG. 40 includes MPEG H264 decoders 237A and 237B respectively for left-eye images and right-eye images, a parallax information extracting portion 247, a right-eye image parallax converting portion 248, and a left-eye image parallax converting portion 249. In the stereoscopic video reproducing apparatus shown in FIG. 40, the parallax information extracting portion 247 newly detects parallax information from the decoded left-eye and right-eye images. In this case, as in the apparatus of FIG. 39A, new parallax information is generated in the parallax information calculating portion 240, through the processing in the user interface 245 and the parallax information coefficient varying portion 246, and it is supplied to the right-eye image parallax converting portion 248 and the left-eye image parallax converting portion 249.

This preferred embodiment has described apparatuses and methods for reproducing stereoscopic video information recorded on an optical disk, but it is needless to say that entirely the same effects are obtained when a hard disk is used as a recording medium.

While the invention has been described in detail, the foregoing description is in all aspects illustrative and not restrictive. It is understood that numerous other modifications and variations can be devised without departing from the scope of the invention.

What is claimed is:

1. A stereoscopic video reproducing method using left-eye images and right-eye images comprising:
    decoding a primary digital image block for a primary image;
    decoding a secondary digital image block for a secondary image; and
    reproducing a stereoscopic image with said decoded primary and secondary images,
    wherein said primary image is used as one of a left-eye image and a right-eye image according to a data flag indicating whether said primary image is used as one of a left-eye image and a right-eye image,
    wherein said secondary image is used as the one of the left-eye image and the right-eye image for which said primary image is not used, and
    wherein said secondary image is dependent on image information in said primary image in such manner that said secondary digital image block is derived from said primary digital image block.

2. A stereoscopic video reproducing apparatus using left-eye images and right-eye images comprising:
    a decoder which decodes a primary digital image block for a primary image, and which decodes a secondary digital image block for a secondary image; and
    a reproducer which reproduces a stereoscopic image with said decoded primary and secondary images,
    wherein said primary image is used as one of a left-eye image and a right-eye image according to a data flag indicating whether said primary image is used as one of a left-eye image and a right-eye image,
    wherein said secondary image is used as the one of the left-eye image and the right-eye image for which said primary image is not used, and
    wherein said secondary image is dependent on image information in said primary image in such manner that said secondary digital image block is derived from said primary digital image block.

3. An optical disc on which is recorded image data used for reproducing a stereoscopic video comprising:
    a primary digital image block for a primary image used as one of a left-eye image and a right-eye image when a stereoscopic video is reproduced;
    a secondary digital image block for a secondary image used as the one of said left-eye image and said right-eye image for which said primary image is not used when said stereoscopic video is reproduced; and
    a data flag which indicates whether said primary image is a left-eye image or a right-eye image,
    wherein said secondary image is dependent on image information in said primary image in such manner that said secondary digital image block is derived from said primary digital image block.

* * * * *